US009760355B2

(12) United States Patent
Mori et al.

(10) Patent No.: US 9,760,355 B2
(45) Date of Patent: Sep. 12, 2017

(54) PARALLELIZING COMPILE METHOD, PARALLELIZING COMPILER, PARALLELIZING COMPILE APPARATUS, AND ONBOARD APPARATUS

(71) Applicants: DENSO CORPORATION, Kariya, Aichi-pref. (JP); WASEDA UNIVERSITY, Tokyo (JP)

(72) Inventors: Hiroshi Mori, Ichinomiya (JP); Mitsuhiro Tani, Toyota (JP); Hironori Kasahara, Tokyo (JP); Keiji Kimura, Tokyo (JP); Dan Umeda, Tokyo (JP); Akihiro Hayashi, Tokyo (JP); Hiroki Mikami, Tokyo (JP); Yohei Kanehagi, Tokyo (JP)

(73) Assignees: DENSO CORPORATION, Kariya (JP); WASEDA UNIVERSITY, Tokyo (JP)

( * ) Notice: Subject to any disclaimer, the term of this patent is extended or adjusted under 35 U.S.C. 154(b) by 0 days.

(21) Appl. No.: 14/302,886

(22) Filed: Jun. 12, 2014

(65) Prior Publication Data

US 2014/0372995 A1 Dec. 18, 2014

(30) Foreign Application Priority Data

Jun. 14, 2013 (JP) ................................. 2013-125607

(51) Int. Cl.
G06F 9/45 (2006.01)
(52) U.S. Cl.
CPC ................ G06F 8/45 (2013.01); G06F 8/452 (2013.01); G06F 8/456 (2013.01)
(58) Field of Classification Search
CPC ....................................................... G06F 8/456
(Continued)

(56) References Cited

U.S. PATENT DOCUMENTS

2007/0255929 A1   11/2007   Kasahara et al.
2007/0283358 A1*  12/2007   Kasahara et al. ............. 718/104
(Continued)

FOREIGN PATENT DOCUMENTS

JP   2008-181558   8/2008
JP   B2-4177681    8/2008

OTHER PUBLICATIONS

Ishizaka et al.; "Cache optimization for coarse grain task parallel processing using inter-array padding."; Languages and Compilers for Parallel Computing. Springer Berlin Heidelberg, 2004. 64-76.*

(Continued)

*Primary Examiner* — Qing Chen
*Assistant Examiner* — Clint Thatcher
(74) *Attorney, Agent, or Firm* — Nixon & Vanderhye PC

(57) ABSTRACT

A parallelizing compile method includes, dividing a sequential program for an embedded system into multiple macro tasks, specifying (i) a starting end task and (ii) a termination end task, fusing (i) the starting end task, (ii) the termination end task, and (iii) a group of the multiple macro tasks, extracting a group of multiple new macro tasks from the multiple new macro tasks fused in the fusing based on a data dependency, performing a static scheduling assigning the multiple new macro tasks to the multiple processor units, so that the group of the multiple new macro tasks is parallelly executable by the multiple processor units, and generating a parallelizing program. In addition, a parallelizing compiler, a parallelizing compile apparatus and an onboard apparatus are provided.

7 Claims, 25 Drawing Sheets

(58) Field of Classification Search
USPC .................................................. 717/146, 149
See application file for complete search history.

(56) References Cited

U.S. PATENT DOCUMENTS

| | | | |
|---|---|---|---|
| 2007/0294680 A1* | 12/2007 | Papakipos et al. | 717/149 |
| 2008/0005547 A1* | 1/2008 | Papakipos et al. | 712/244 |
| 2008/0086617 A1 | 4/2008 | Kasahara et al. | |
| 2009/0070772 A1* | 3/2009 | Shikano | 718/106 |
| 2009/0144748 A1* | 6/2009 | Foody | 718/107 |
| 2010/0138810 A1 | 6/2010 | Komatsu et al. | |
| 2010/0174876 A1 | 7/2010 | Kasahara et al. | |
| 2011/0083125 A1 | 4/2011 | Komatsu et al. | |
| 2011/0271265 A1* | 11/2011 | Drozdov et al. | 717/160 |
| 2012/0260239 A1* | 10/2012 | Martinez Canedo et al. | 717/149 |

OTHER PUBLICATIONS

Bondhugula et al.; "A Model for Fusion and Code Motion in an Automatic Parallelizing Compiler"; Parallel Architectures and Compilation Techniques conference (PACT'10); Sep. 11-15, 2010.*
Chang et al.; "Inline function expansion for compiling C programs."; ACM SIGPLAN Notices 24, No. 7 (1989): 246-257.*
Polychronopoulos, Constantine D.; "Automatic Restructuring of Fortran Programs for Parallel Execution"; An IP.com Prior Art Database Technical Disclosure; Apr. 22, 2007.*
Yoshida et al.; "A Data-Localization Scheme using Task-Fusion for Macro-Dataflow Computation"; IEEE PACRIM'95 Conference Proceedings; May 1995.*
K. Seo, J. Yoon, J. Kim, T. Chang, K. Yi, and N. Chang, "Coordinated implementation and processing of a unified chassis control algorithm with multi-central procesing unit," JAUT01346, IMechE, 2009, vol. 224 Part D:J.Automobile Engineering, 21 pgs.
Hiroki Honda, Masahiko Iwata, and Hironori Kasahara, "Coarse grain parallelism detection scheme of a Fortran program" Transactions of IEICE D-I. vol. J73-D-I No. 12, pp. 951-960, Dec. 1990.
Hironori Kasahara, Kento Aida, Akimasa Yoshida, Masami Okamoto, and Hiroki Honda "A Macro-Task Generation Scheme for Fortran Macro-Dataflow Computation", Transactions of IEICE D-I. vol. J75-D-I, No. 8, pp. 511-525, Aug. 1992.
"Optimally Scheduled Advanced Multiprocessor Application Program Interface" OSCAR API ver.2, Waseda University, 2008, 91 pgs.
Minji Cha, Kyong Hoon Kim, Chung Jae Lee, Doujun Ha, and Byoung Soc Kim, "Deriving Hign-Performance Real-Time Multicore Systems based on Simulink Applications" 2011 IEEE, DOI 10.1109/DASC.2011.64, pp. 267-274.
Kyungil Seo and Taeyoung Chung, "An Investigation into Multi-Core Architectures to Improve a Processing Performance of the Unified Chassis Control Algorithms." SAE Int. J. Passeng. Cars—Electron. Elect. Syst. vol. 3 Issue 1, pp. 53-62, Published Apr. 12, 2010.

* cited by examiner

FIG. 12

```
int var1[100];
int var2[100];
int flag;
#pragma omp threadprivate(var1)
#pragma oscar distributedshared vpc(0) (var2)
#pragma oscar onchipshared(flag)

#pragma omp parallel subsections
{
#pragma omp subsection
  {
#pragma oscar dma_transfer
    {
#pragma oscar dma_contiguous_parameter(var2, var1, 100, flag, 1)
      ...
    }
  }
#pragma omp subsection
  {
#pragma oscar fvcontrol( ... )
    ...
  }
}
```

FIG. 15

```
OMP_NUM_THREADS=4 pragma omp parallel subsections
{
  #pragma omp subsection
  {
    ...
  }
  #pragma omp subsection
  {
    ...
  }
  #pragma omp subsection
  {
    ...
  }
  #pragma omp subsection
  {
    ...
  }
```

FIG. 16

```
void thread_function_000(void);
void thread_function_001(void);
void thread_function_002(void);
void thread_function_003(void);

int thr1;
int thr2;
int thr3;

oscar_thread_create( &thr1, thread_function_001, 0);
oscar_thread_create( &thr2, thread_function_002, 1);
oscar_thread_create( &thr3, thread_function_003, 2);

thread_function_000();
oscar_thread_join(thr1);
oscar_thread_join(thr2);
oscar_thread_join(thr3);
```

```
int main(void) {
    int tid;
    MdlInitializeSizes();  /*INITIALIZE*/
    MdlStart();
    for(ENGINE SPEED) {
        Model_step;  /*MODEL ALGORITHM ARE EXECUTED*/
    }
}
```

FIG. 24

```
                                                                    330
┌─────────────────────────────────────────────────────────────────────┐
│ if (Fuel_U.TPS >= Fuel_P.Coolant_Limit_UpperSat) {                  │
│   tmp = Fuel_P.Coolant_Limit_UpperSat;                              │
│ } else if (Fuel_U.TPS <= Fuel_P.Coolant_Limit_LowerSat) {           │
│   tmp = Fuel_P.Coolant_Limit_LowerSat;                              │
│ } else {                                                            │
│   tmp = Fuel_U.TPS;                                                 │
│ }                                                                   │
│                                                                     │
│ /* End of Saturate: '<S8>/Coolant_Limit' */                         │
│                                                                     │
│ /* Lookup_n-D: '<S8>/G1_Coolant_Lookup' */                          │
│ Fuel_B.G1_Coolant_Lookup = look1_binlxpw(tmp,                       │
│   Fuel_P.G1_Coolant_Lookup_bp01Data, Fuel_P.G1_Coolant_Lookup_tableData, 12U); │
└─────────────────────────────────────────────────────────────────────┘

....
 ....
 ....                                                               331
┌─────────────────────────────────────────────────────────────────────┐
│ if (Fuel_U.TPS >= Fuel_P.Coolant_temp_limit_UpperSat) {             │
│   tmp = Fuel_P.Coolant_temp_limit_UpperSat;                         │
│ } else if (Fuel_U.TPS <= Fuel_P.Coolant_temp_limit_LowerSat) {      │
│   tmp = Fuel_P.Coolant_temp_limit_LowerSat;                         │
│ } else {                                                            │
│   tmp = Fuel_U.TPS;                                                 │
│ }                                                                   │
│                                                                     │
│ /* End of Saturate: '<S6>/Coolant_temp_limit' */                    │
│                                                                     │
│ /* Lookup_n-D: '<S6>/Dfco_Rpm_Threshold_table' */                   │
│ Fuel_B.Dfco_Rpm_Threshold_table = look1_binlxpw(tmp,                │
│   Fuel_P.Dfco_Rpm_Threshold_table_bp01Da,                           │
│   Fuel_P.Dfco_Rpm_Threshold_table_tableD, 1U);                      │
└─────────────────────────────────────────────────────────────────────┘
```

PARALLELIZING COMPILE METHOD, PARALLELIZING COMPILER, PARALLELIZING COMPILE APPARATUS, AND ONBOARD APPARATUS

CROSS REFERENCE TO RELATED APPLICATION

This application is based on Japanese Patent Application No. 2013-125607 filed on Jun. 14, 2013, the disclosure of which is incorporated herein by reference.

TECHNICAL FIELD

The present disclosure relates to a parallelizing compile method, a parallelizing compiler, a parallelizing compile apparatus, and the onboard apparatus, on which a multiprocessor system is mounted. The parallelizing compile method, the parallelizing compiler, and the parallelizing compile apparatus generate a parallelizing program for a multiprocessor system from a sequential program for an onboard apparatus for an embedded system. The multiprocessor system is mounted to the onboard apparatus, and the sequential program is parallel executed by a single processor system.

BACKGROUND

In order to develop a next generation vehicle realizing a safer, more comfortable, cheaper, and more energy saving vehicle, advancement and integration of (i) a real time control system such as engine control and (ii) an information system such as a presentation of information required for a human recognition, a surrounding vehicle recognition, and traveling, and an output of music, an video image, or the like become important.

An improvement of a processor is important in order to implement the advancement and the integration of the control system and the information system. For example, to improve the engine control system, which is important for a development of a safer and more comfortable vehicle having a good fuel efficiency, an increase of calculation loads may be unavoidable due to an advancement of a control algorithm, an implementation of a new control function, or the like. Acceleration of the processor implementing the real time control may be required.

The applicants of the present invention have found the following. However, an improvement of an operating frequency of a processor like the convention manner may be difficult since power consumption may increase in proportion to cube of the frequency. Therefore, a multicore processor may become used at a quick pace. The multicore processor has a feature that multiple processor cores of low operating frequency are integrated on one chip. The multiple processor cores are parallelly operated at a low frequency in a low voltage to reduce the power consumption. The acceleration of processing and low voltage operation may be both realized.

So that the multicore processor performs a processing faster than a single core processor, a processing of the sequential program for the single core processor is required to divide, and each processing is assigned to each processor core in a form where a communication between each of the processor cores becomes minimum. Conventionally, a person performs a parallelizing of the sequential program. However, this work may be very difficult and require a long period of time, so that many difficulties such as an increase in development costs and a reliability of a parallelized program, or the like, may occur.

In non-patent literature 1, a technology for raising a throughput is disclosed in which functions are distributed to each processor core in an onboard apparatus having a multicore processor.

However, in order to fully utilize a processing capability of each processor core, it may be necessary to extract a processing, which is parallelly executable, and to assign to different processor cores. Therefore, when a function is simply distributed to each processor core, only the throughput is improved, and a latency may not be reduced. A processing may not be performed at a high speed.

Non-patent literature 1: K. Seo, J. Yoon, J. Kim, T. Chung, K. Yi, and N. Chang, "Coordinated implementation and processing of a unified chassis control algorithm with multi-central-processing unit", JAUTO1346 IMechE, 2009, Vol. 224 Part D.

SUMMARY

It is an object of the present disclosure to provide a parallelizing compile method, a parallelizing compiler, a parallelizing compile apparatus, and an onboard apparatus, in which a reliable parallelization program or the like for an embedded system for an onboard apparatus is reliable, operates at high speed, and is provided at a reduced development period and cost.

According to one aspect of the present disclosure, a parallelizing compile method includes: dividing a sequential program for an embedded system for an onboard apparatus into a plurality of macro tasks according to a predetermined method, the sequential program being executed by a single processor system; specifying, based on a control dependency between the macro tasks, (i) a starting end task of the macro tasks as a starting point, wherein the starting end task has a processing branched into different ones of the macro tasks, and (ii) a termination end task of the macro tasks, wherein the termination end task is either one of the macro tasks commonly executed among a plurality of series of processings, which are sequentially executed from the starting end task; fusing (i) the starting end task specified by the specifying, (ii) the termination end task executed from the starting end task in the processings, and (iii) a group of the macro tasks executed after execution of the starting end task and before execution of the termination end task into a new macro task; extracting a group of new macro tasks, which are parallelly executable by a plurality of processor units included in a multiprocessor system mounted to the onboard apparatus, from the new macro tasks fused in the fusing, based on a data dependency; performing a static scheduling assigning the new macro tasks to the processor units, so that the group of new macro tasks is parallelly executable by the processor units; and generating a parallelizing program executed by the multiprocessor system, based on a result of the static scheduling.

According to another aspect of the present disclosure, a parallelizing compiler causing a computer to perform the parallelizing compile method is provided. According to another aspect of the present disclosure, a parallelizing compile apparatus is provided. According to another aspect of the present disclosure, an onboard apparatus including a multicore processor system operated by a parallelizing program generated by the parallelizing compile method is provided.

According to the parallelizing compile method, the parallelizing compiler, the parallelizing compile apparatus, and the onboard apparatus, it is possible to automatically generate a reliable parallelizing program, which performs a processing at high speed, from the sequential program for the embedded system for the onboard apparatus. In addition, it is possible to reduce a development period and a development cost when a parallelizing program for the embedded system for the onboard apparatus is generated.

BRIEF DESCRIPTION OF THE DRAWINGS

The above and other objects, features and advantages of the present disclosure will become more apparent from the following detailed description made with reference to the accompanying drawings. In the drawings:

FIG. 12 is a drawing illustrating an example of an automatic parallelizing API;

FIG. 15 is a drawing illustrating an example of a directive of the automatic parallelizing API;

FIG. 16 is a drawing illustrating an example of a runtime library function generated by the automatic parallelizing API standard translator;

FIG. 24 is a drawing illustrating an example of the vehicle control program in which local variables are repeatedly used;

DETAILED DESCRIPTION

Figure 1:
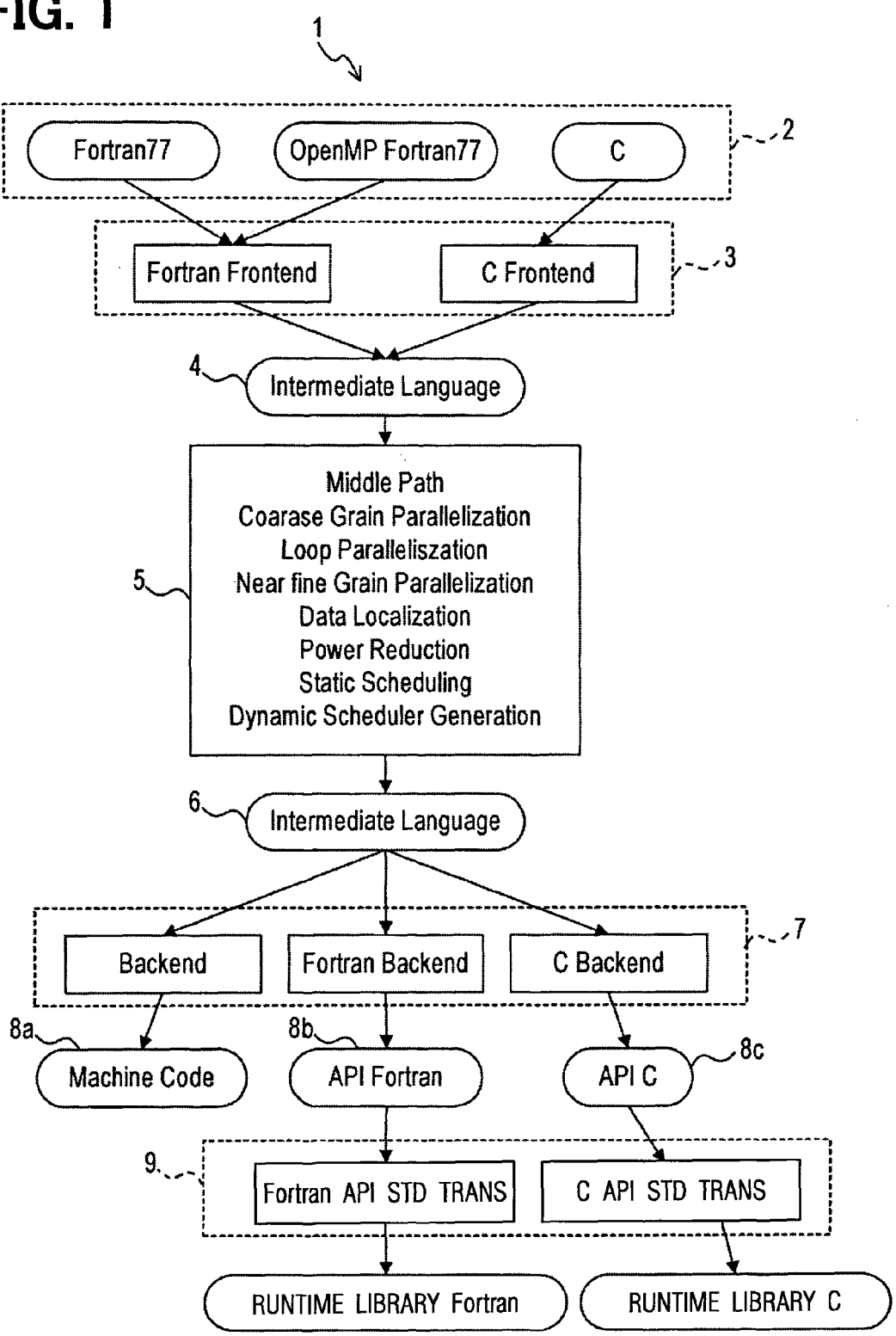
FIG. 1 is a block diagram illustrating a configuration of an automatic parallelizing compiler.

Embodiments of the present disclosure will be described with referring to the drawings. Incidentally, the embodiment of the present disclosure is not limited to the following embodiment, and may take various forms as long as within a technical scope of the present disclosure.

1. Automatic Parallelizing Compiler

An automatic parallelizing compiler 1 of the present embodiment has a function which generates a parallelizing program for a multiprocessor system for an embedded system from a source program (a sequential program) for a single processor system for an embedded system.

1-1. Design Concept of Automatic Parallelizing Compiler 1

The automatic parallelizing compiler 1 of the present embodiment has the following functions:

(1) Multigrain parallel processing;
(2) Insertion of a static scheduling code at the time of compile;
(3) Generation of a dynamic scheduling code at the time of execution;
(4) Implementation of a hierarchical macro data flow;
(5) Parallelism extraction of division/fusion of a macro task, a loop distribution/interchange, or the like;
(6) Improvement of a data transmission efficiency by a data localization; and
(7) Power reduction by the compiler.

1-2. Internal Processing of Automatic Parallelizing Compiler

The automatic parallelizing compiler 1 includes three stages: a front end (FE) 3, a middle path (MP) 5, and a back end (BE) 7 (referring to FIG. 1). Each of the stages is independently executed. Intermediate languages 4, 6 are generated from the FE 3, and the MP 5, respectively. A code transfer is performed by the intermediate languages 4, 6.

Incidentally, the FE 3 performs a lexical analysis and a syntax analysis of a source code 2 of a sequential program, and generates the intermediate language 4, which is parsed in the MP 5. The intermediate language 4 generated by the FE 3 is basically expressed by a parse tree having four operands. The intermediate language 4 forms one block, and is not structured.

The MP 5 performs a control dependency analyses, a data dependency analyses, an optimization, or the like. The MP 5 performs a coarse grain (macro data flow, MDF) parallelizing, a medium grain (micro tasking/Doall loop parallelize) parallelizing, and a near fine grain parallelizing.

The BE 7 reads the parallelized intermediate language 6 generated by the MP 5, and generates an actual machine code. The BE 7 contains a sub BE generating an assembly code 8a of the multicore architecture, which is a target, and another sub BE generating a parallelizing FORTRAN code for an OpenMP or a C code. In addition, the BE 7 includes another sub BE, which outputs a code corresponding to various architectures. For example, the BE 7 includes a BE, which generates parallelizing codes 8b, 8c for a memory allocation and a data transfer. The memory allocation and the data transfer are performed by a parallelizing API 9, as described below.

1-3. Parallelism Analyses of Automatic Parallelizing Compiler

The automatic parallelizing compiler 1 performs a macro data flow processing, in which a sequential program is divided into three kinds of coarse grain tasks (referred to as a macro task, MT): a basic block (BB), a repetition block (RB), and a subroutine block (SB).

Figure 2:
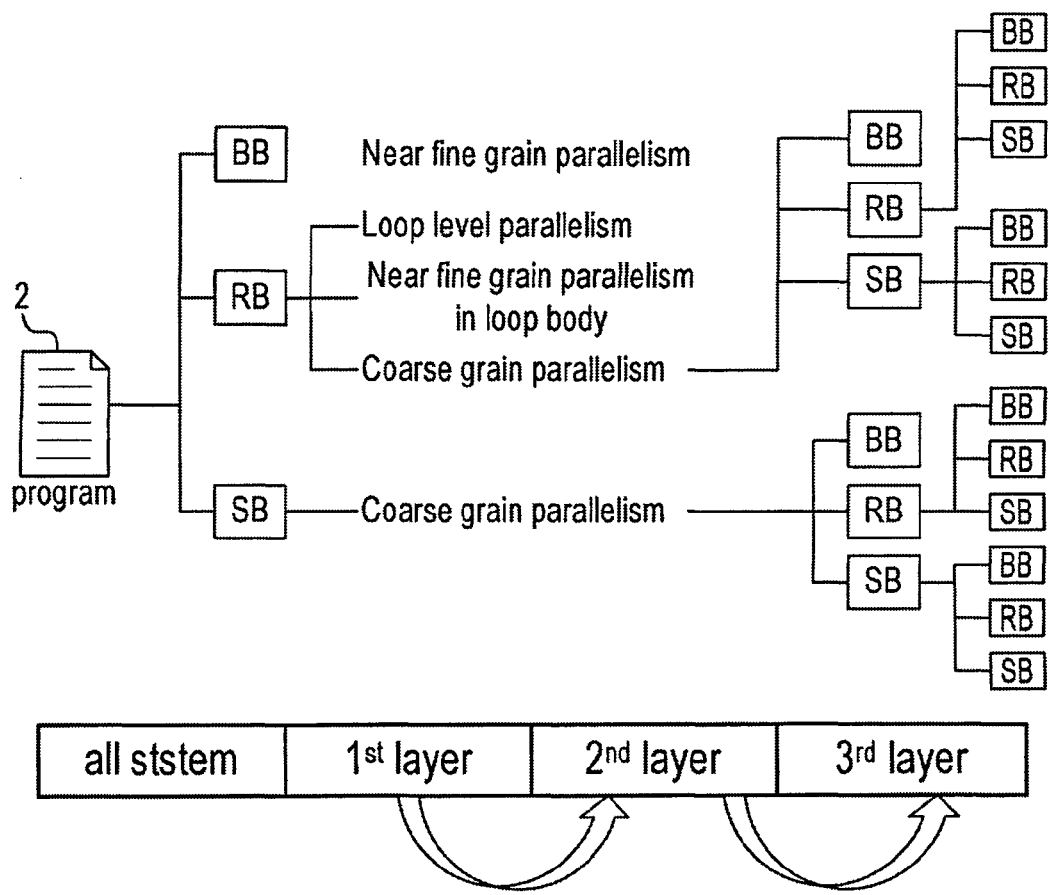
FIG. 2 is a drawing illustrating macro tasks determined hierarchically.

However, a utilization efficiency of a processor may not increase by the macro data flow processing according to a shape of a program. A coarse grain parallelism may not be extracted sufficiently. Therefore, in the automatic parallelizing compiler 1, a conventional single hierarchy macro data flow processing method is extended, and a hierarchical macro data flow processing is used. In the hierarchical macro data flow processing, the macro data flow processing is hierarchically used to the inside of the MT. In the hierarchical macro data flow processing, the MT is hierarchically defined as described in FIG. 2. In addition, with respect to the generated macro tasks of each hierarchy, a parallelism between the macro tasks is analyzed.

(Generation of Macro Flow Graph)

The automatic parallelizing compiler 1 analyzes the control dependency and the data dependency between the macro tasks to the generated macro tasks of each of the hierarchy. This analysis result is expressed as a macro flow graph (MFG) (referring to FIG. 3).

Figure 3:
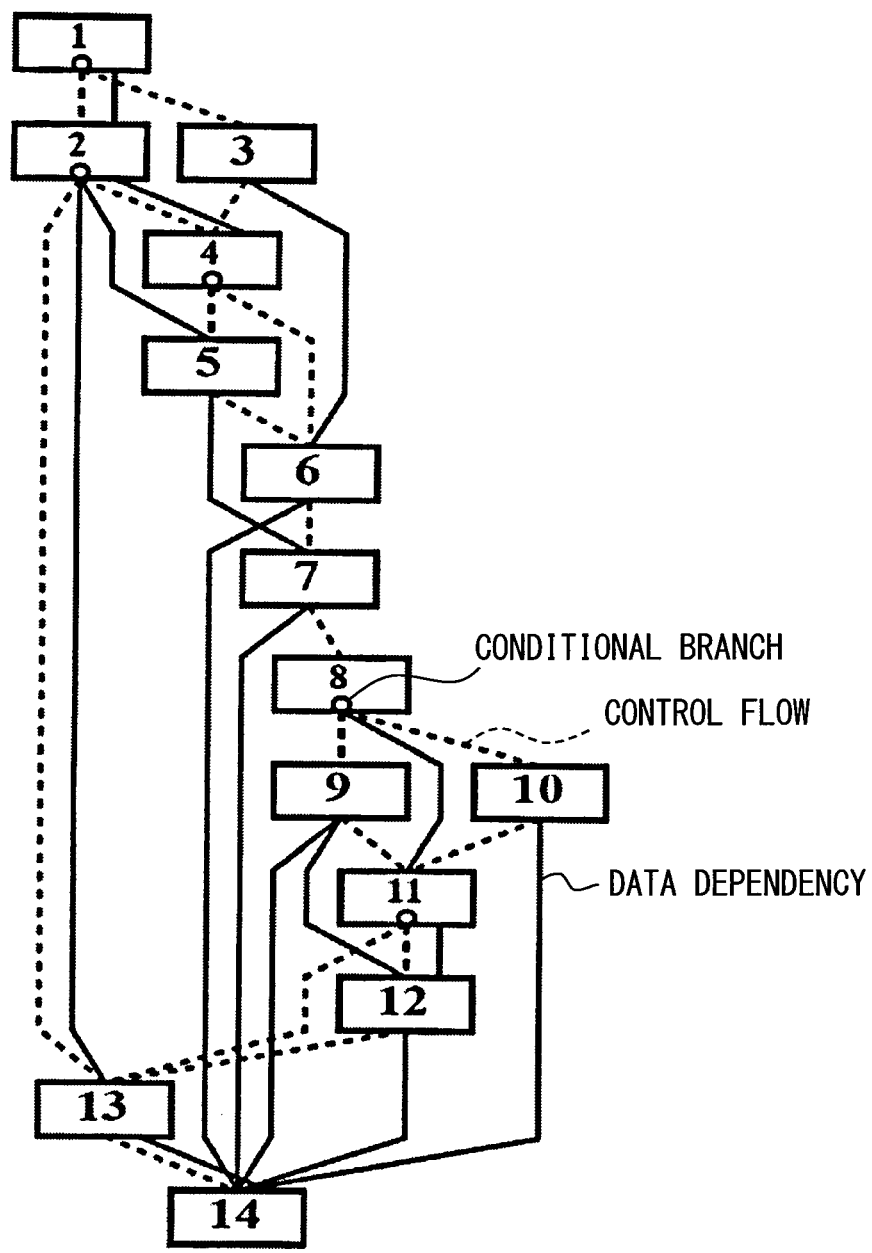
FIG. 3 is a drawing illustrating an example of a macro flow graph.

In FIG. 3, a node represents a macro task, a continuous line (also referred to as a continuous line edge) represents a data dependency, a dotted line (also referred to as a dotted line edge) represents a control dependency, and a small circle in the node represents a conditional branching. Incidentally, an arrow head of the edges is omitted in the MFG, it is supposed that a direction of the edges is downward. The number of a rectangular represents the number of the macro task.

(Generation of Macro Task Graph)

The MFG represents the control dependency and the data dependency between the macro tasks. The MFG does not represent the parallelism between the macro tasks. In order to extract the parallelism between the macro tasks, the control dependency and the data dependency are both considered and an earliest executable condition analyses is required to be performed. The earliest executable conditions represent a condition where the MT is executable at the earliest time. The earliest executable condition is gained from the following execution conditions.

(1) When a MTi have the data dependency to a MTj, the MTi is not performed until an execution of the MTj is completed.

(2) When the conditional branching point of the MTj is determined, even when the execution of the MTj is not completed, the MTi having the control dependence to the MTj may be executed. Herein, a symbol "i" and a symbol "j" represent positive integers, representing an order of the MT.

Therefore, a general form of the earliest executable conditions is described as follows:

(the MTj having the control dependency to the MTi branches to the MTi)

AND (a MTk ($0 \leq k \leq |N|$) having the data dependency to the MTi is completed) OR (it is determined that the MTk is not be executed). Herein, a symbol "k" and a symbol "N" represent positive integers. For example, the earliest executable conditions of the MT6 of the MFG in FIG. 3 are described as follows.

((The MTbranches to the MT3) OR (the MT2 branches to the MT4))

AND ((the MT3 is completed) OR (the MT1 branches to the MT2)).

When the control dependency of the MFG is considered, a state where the MT3 is completed includes a state where the MT1 branches to the MT3, and a state where the MT2 branches to the MT4 represents a state where the MT1 branches to the MT2. Therefore, the above conditions may be simplified and represented as follows.

((The MT3 is completed) OR (the MT2 branches to the MT4)).

Figure 4:
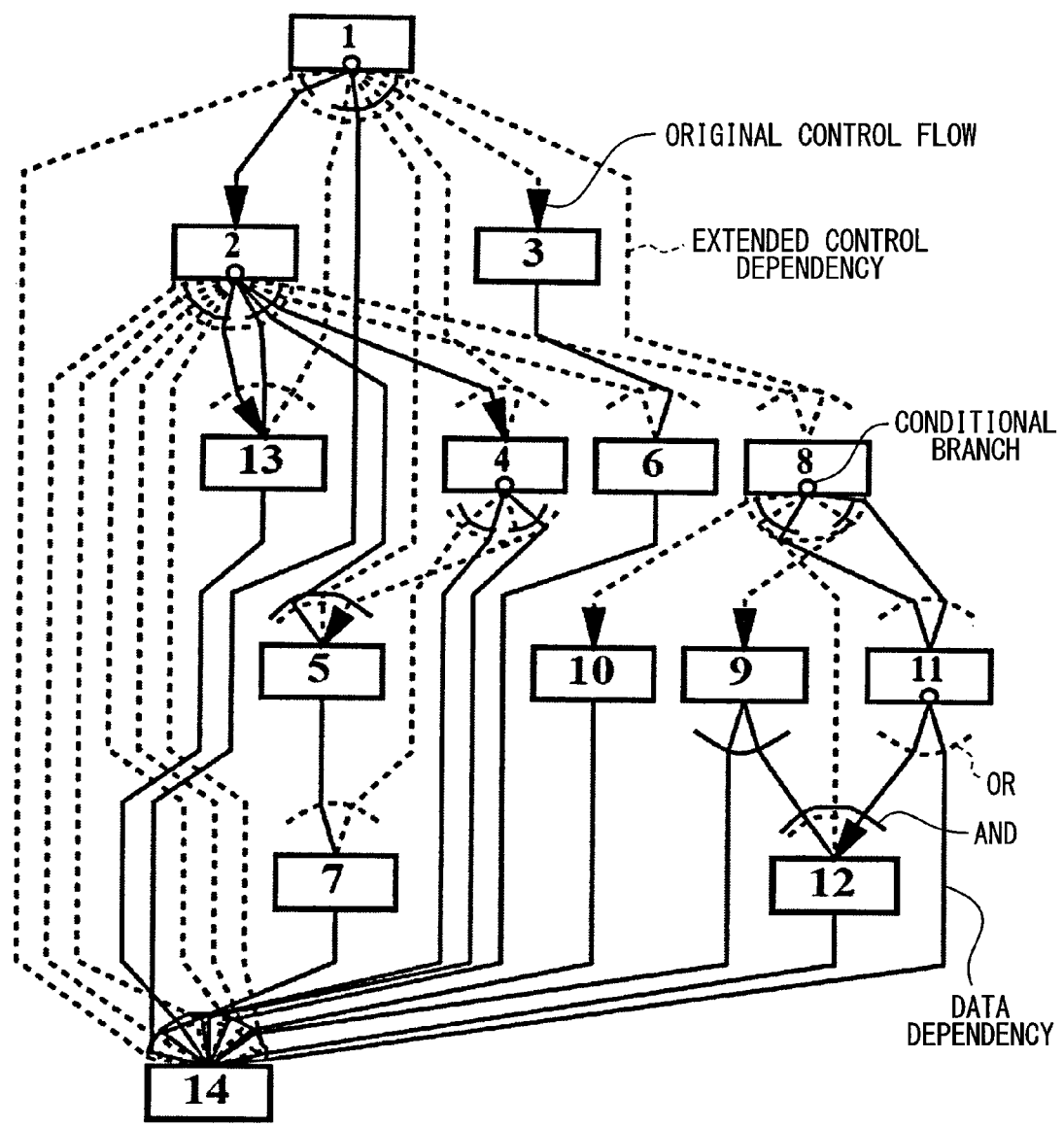
FIG. 4 is a drawing illustrating an example of a macro task graph.

The earliest executable condition of the macro task is represented with the macro task graph (MTG) as described in FIG. 4.

A node in the MTG of FIG. 4 represents a macro task, a continuous line (also referred to as a continuous line edge) represents a data dependency, a dotted line (also referred to as a dotted line edge) represents an expanded control dependency, and a small circle in the node represents a conditional branching, which are similar with the MFG in FIG. 3. The number of a rectangular represents the number of the macro task. Incidentally, the extended control dependency includes the normal control dependency and a conditional branching. The conditional branching includes a state where it is confirmed that a precedence node is not executed so that the data dependency and the control dependency are complexly satisfied.

An arc bundling the edges in FIG. 4 represents two different meanings. A continuous line arc represents that the edges, which are bundled with the continuous line arc, have an AND relation. A dotted line arc represents that the edges, which are bundled with the dotted line arc, have an OR relation.

Incidentally, an arrow head of the edges is omitted in the MTG, it is supposed that a direction of the edges is downward. In addition, the edges having an arrow head represent an original control dependency, which is included originally in the sequential program and not generated by the extended control dependency.

1-4. Multigrain Parallel Processing

In the automatic parallelizing compiler 1, in addition to a conventional loop parallelization, a multigrain parallel processing in which the coarse grain task parallel processing and the near fine grain parallel processing are effectively combined is implemented (referring to a reference 1). The coarse grain task parallel processing uses a parallelism between the coarse grain tasks in loops and in subroutines. The near fine grain parallel processing uses a parallelism between statements.

Reference 1: Hiroki Honda, Masahiko Iwata, and Hironori Kasahara, "Coarse grain parallelism detection scheme of a Fortran program" Transactions of IEICE D-I. Vol. J73-D-I No. 12, pp. 951-960, December 1990.

(Coarse Grain Task Parallel Processing)

The automatic parallelizing compiler 1 generates the macro flow graph (MFG) expressing a control dependency and the data dependency between the MTs such as the BB, the RB, and the SB, or the like. In addition, the automatic parallelizing compiler 1 expresses the parallelism between the MTs derived from the MFG by the earliest executable condition analyses as the macro task graph (MTG) (referring to reference 1 and reference 2).

Reference 2: Hironori Kasahara, Kento Aida, Akimasa Yoshida, Masami Okamoto, and Hiroki Honda "A Macro-Task Generation Scheme for Fortran Macro-Dataflow Computation", Transactions of IEICE D-I. Vol. J75-D-I, No. 8, pp. 511-525. August 1992.

The automatic parallelizing compiler 1 assigns the MTs of the MTG to processor groups (PGs), in which one or more processor elements (PEs) have been grouped.

(Medium Grain Parallel Processing)

When the MT assigned to the PG may perform the parallel processing on a DOALL loop or an iteration level, the processor in a processor cluster performs the medium grain parallel processing with respect to the MT. The medium grain parallel processing represents the parallel processing using a parallelism between DO loop iterations, and the medium grain parallel processing is a type of a general parallel processing in the parallel processing in the multiprocessor.

(Near Fine Grain Parallel Processing)

The near fine grain parallel processing represents the parallel processing to the near fine grain task in a statement level. By the near fine grain parallel processing, a parallel execution may be possible to a statement without having dependence so as to shorten an execution time. The near fine grain parallel processing is performed for a basic block sequentially performed without branching, and a body part of a sequential loop. In the near fine grain parallel processing, the statement is assigned to each of the PEs by a static scheduling by a compiler. The automatic parallelizing compiler 1 generates only a statement assigned with a required synchronization code and a required data transfer code as the macro task code for each of the PE. The near fine grain parallel processing is the parallel processing using a task having a small grain size called a statement, and the execution time of the task may be short in many cases. Therefore, in order to efficiently perform the near fine grain parallel processing, a high-speed data transfer between PEs may be required.

1-5. Macro Task Scheduling

In the coarse grain task parallel processing, the macro task generated in each hierarchy is assigned to the PG, and performed. As a scheduling technique that determines which PG the macro task is assigned to, a dynamic scheduling and a static scheduling are used. The scheduling technique is chosen based on a shape of the macro task graph, a nondeterminism at the execution time of the macro task graph, or the like.

(Dynamic Scheduling)

When there is indeterminacy at an execution time such as a conditional branching or the like, the macro task is assigned to the PG by the dynamic scheduling at the execution time. According to an completion of the macro task or a determination of a branch direction of the macro task, a dynamic scheduling routine operates a macro task execution control table, and inspects the earliest executable condition of each of the macro tasks.

When the macro task is executable, the macro task is inputted into a ready queue. The macro tasks in the ready queue are sorted according to priority. The macro task at a head of the ready queue is assigned to the processor cluster in an idle state.

When a dynamic scheduling code is generated, a centralized scheduling system and a distributed scheduling system may be used according to a total number of a processor and a synchronous overhead of a system. In the centralized scheduling system, one exclusively used processor performs the scheduling. In the distributed scheduling system, each processor performs the scheduling function.

(Static Scheduling)

The static scheduling is used when the macro task graph has only a data dependency edge, and in the static scheduling, the automatic parallelizing compiler 1 determines an assignment of the macro task to the PG at a compile time.

Since the static scheduling may eliminate a scheduling overhead at the execution time, and may minimize an overhead of the data transfer and synchronization, it is possible that the static scheduling is effectively used with respect to the task having a fine grain size.

When performing the static scheduling, an estimated value of a task cost (also referred to as an estimated cost) in the automatic parallelizing compiler 1 is used. Alternatively, a real cost of the task may be applied by using a profile automatic feedback function of the automatic parallelizing compiler 1.

Figure 5:
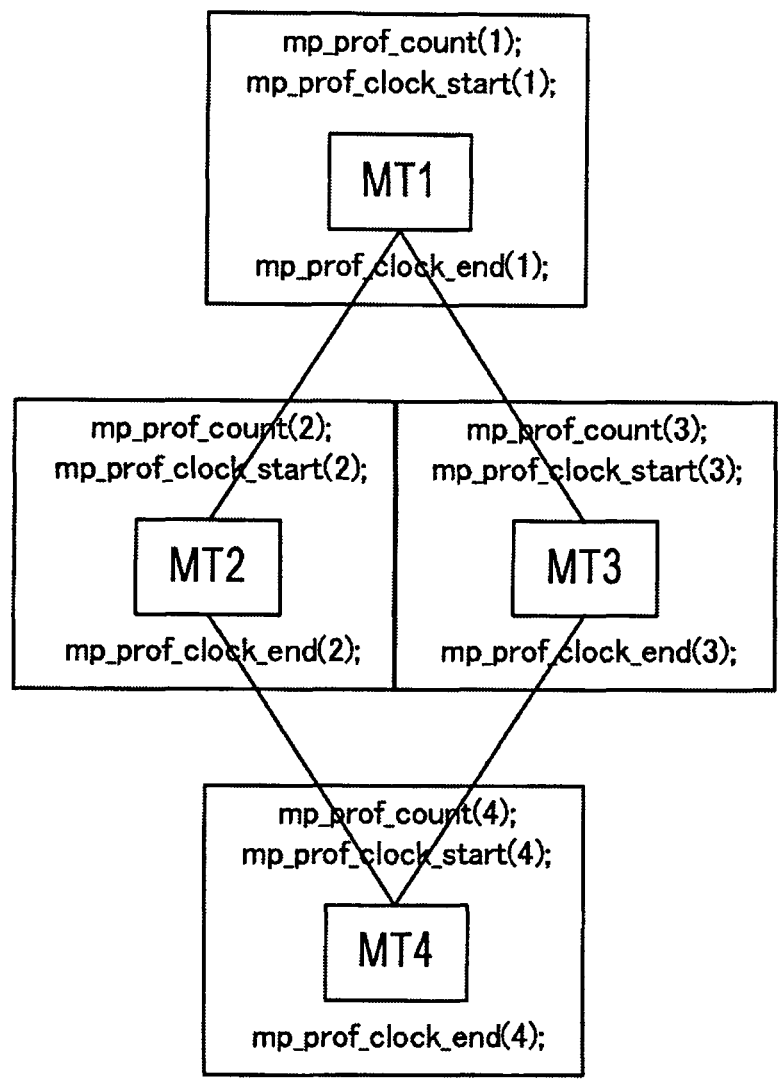
FIG. 5 is a drawing illustrating a compilation order when a profile automatic address feedback function is used.
Figure 6:
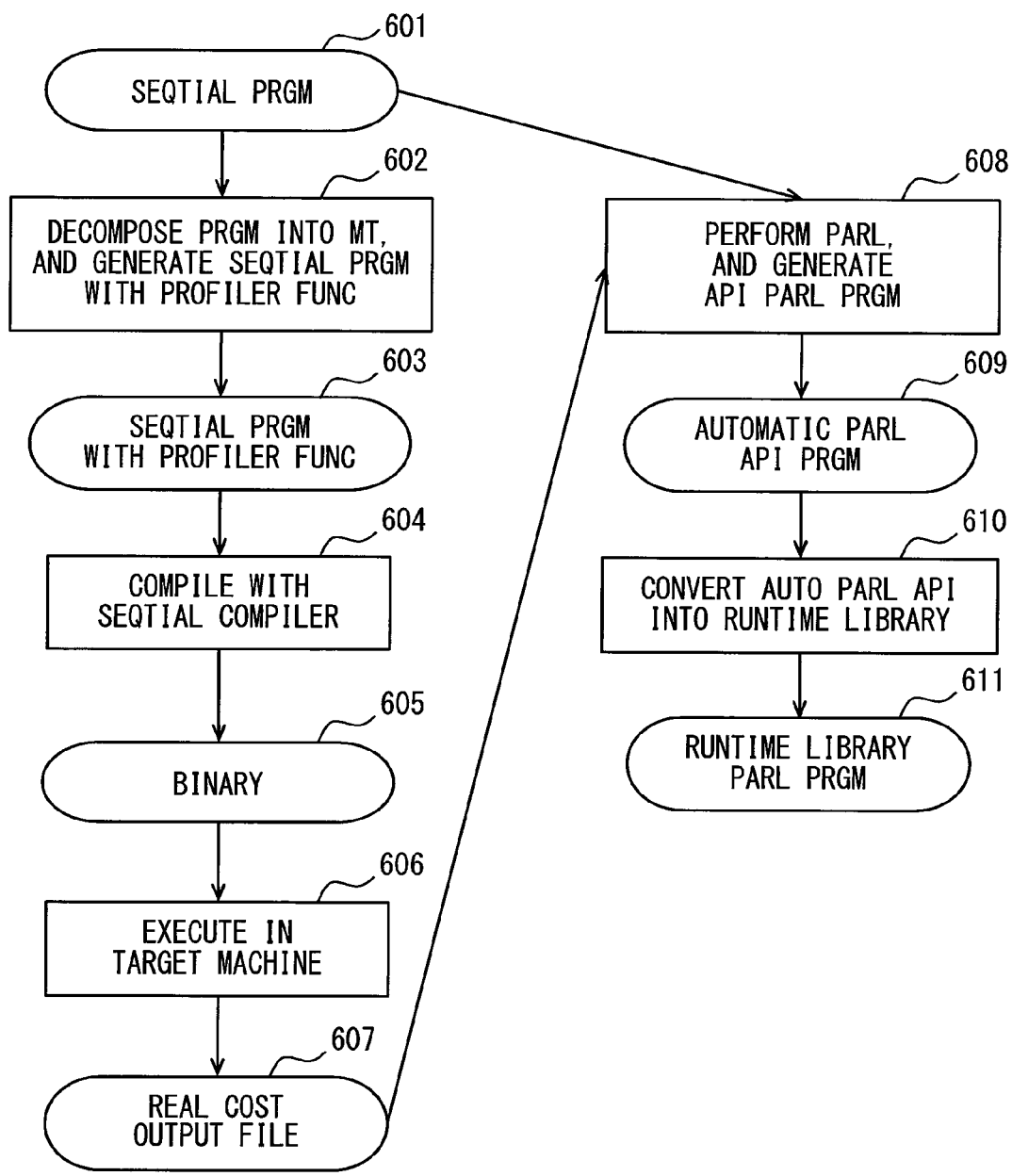
FIG. 6 is a flow chart about the compilation order when the profile automatic address feedback function is used.

FIG. 5 and FIG. 6 illustrate a compile flow at the time when the profile automatic feedback function is used. When the profile automatic feedback function is used, at a first phase, the sequential program is decomposed into the MTs, and inserts a profiler function for each of the MTs to generate the sequential program (referring to FIG. 5, and referring to 601, 602, 603). The profiler function measures a task execution cost (also referred to as a clock cycle) and a total number of task executions.

As a second phase, the automatic parallelizing compiler 1 receives the outputted file and the sequential program to generate a parallelizing program, in which a scheduling is performed based on the real cost (referring to FIG. 6). The sequential program including the profiler function is compiled by the sequence compiler (604) to generate a binary code (605). When the sequential program including the profiler function is executed once on a target machine (606), the profiler function outputs a file of information (a real cost) of the task execution cost and the number of task executions on the target machine (607). The automatic parallelizing compiler performs the parallelism analyses to the sequential program by referring with the outputted file representing the real cost, and generates a OSCAR API parallelizing program (608). An automatic parallelizing API program is generated (609). The automatic parallelizing compiler converts the automatic parallelizing API into a runtime library by using an automatic parallelizing API standard translator (610), and the runtime library parallelizing program is generated (611).

1-6. Data Localization

Figure 7:
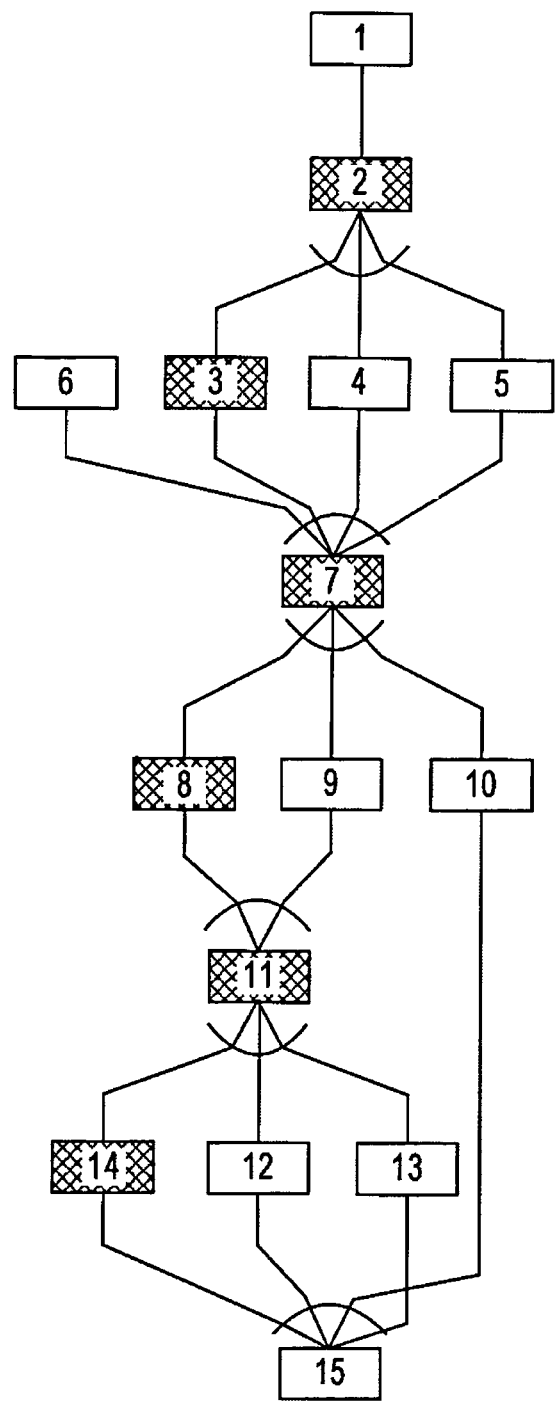
FIG. 7 is a drawing illustrating an example of the macro task graph.

The automatic parallelizing compiler 1 may perform a cache optimization over the whole program. The automatic parallelizing compiler 1 analyzes the parallelism between the loops, or the like, and in a case where the automatic parallelizing compiler 1 detects that there is a data dependency between the loops of the MTs 2, 3, 7, 8, 11, 14, which comprises a data localization group and are shaded in FIG. 7, the automatic parallelizing compiler 1 attempts to perform a global optimization of a cache between the loops with the data dependency (referring to reference 3: Japanese patent No. 4177681). Incidentally, the data dependency of the macro tasks is represented by the data dependency edge illustrated by a continuous line. The number of a rectangular represents the number of the macro task.

Figure 8:
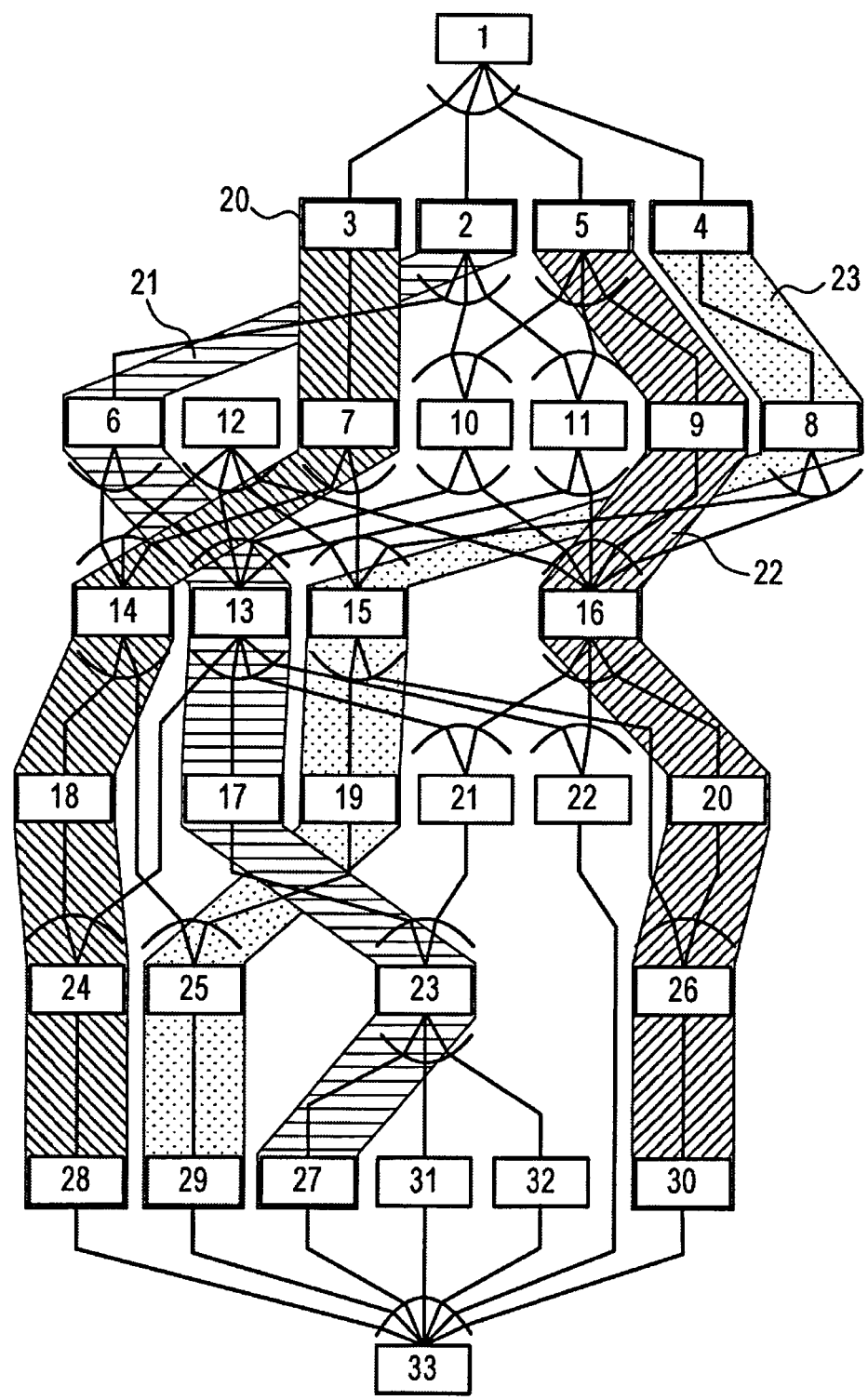
FIG. 8 is a drawing illustrating an example of the macro task graph which is divided for a global optimization of a cache between loops having dependency.
Figure 9:
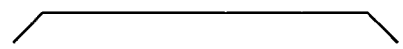
FIG. 9 is a drawing illustrating a situation of an assignment of divided loops to a processor.

Specifically, the automatic parallelizing compiler 1 (i) examines an array accessed by each loop, (ii) divides the macro tasks into four loops 20, 21, 22, 23 (as described in FIG. 8 as the MTG after division), and (iii) adjusts the divided loops so that one certain divided loop accesses to the identical part of the array, and (iv) assigns the certain dived loop into one certain processor (referring to FIG. 9 illustrating a schedule for two processors). Accordingly, in the certain divided loop, all array data is reused on a cache. The number of a rectangular in FIG. 8 and FIG. 9 represents the number of the macro task.

This localization technology relates to the following local memory administration technology and the following data transfer technology (referring to reference 5: UK Patent No. 2478874).

(1) When a local memory or a distributed shared memory with an arbitrary size is given, before the local memory or the distributed shared memory is accessed with DMA (or DTU) (referring to reference 4: Japanese patent No. 4476267), the local memory or the distributed shared memory is loaded to a local memory or a distributed shared memory close to the processor in advance, and is reused throughout a program. The DMA represents a direct memory access, and the DTU represents a data transfer unit.

(2) When a receiver memory is full, and a source processor or the like is informed by a synchronous flag representing a DTU of a receiver processor has swept out data to a shared memory or the like based on a swept out priority, the source processor or the like transmits data to the receiver memory automatically.

(3) When data, which is reused in future and not used for a while, is stored in a memory area, and it is required to spare the memory area, the DTU moves the data to a centralized shared memory behind a task execution by a CPU, and reloads by the time of use.

1-7. Power Reduction by Automatic Parallelizing Compiler

According to the automatic parallelizing compiler 1, since a scheduling result to the processor of the task is analyzed, a frequency/voltage control of each processor and a power gating control are performed automatically, so that it is possible to reduce power consumption.

Figure 10:
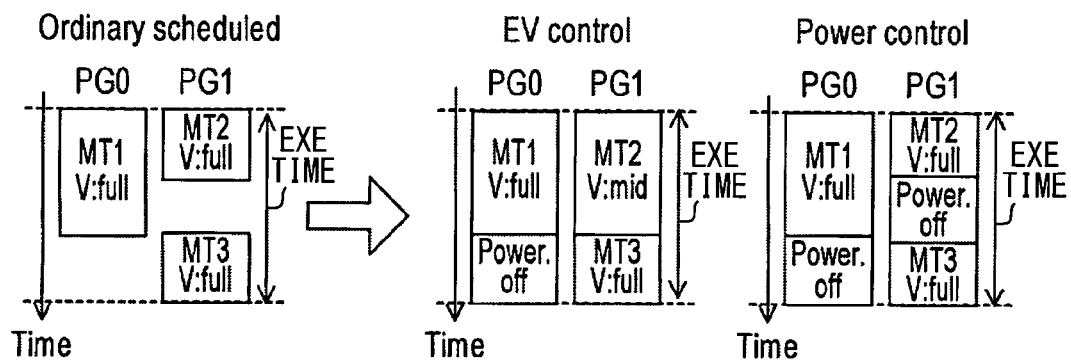
FIG. 10 is a drawing illustrating a running state of the macro task assigned to each processor group in a shortest execution mode.

FIG. 10 illustrates a shortest execution time mode in (i) an ordinary scheduled results, (ii) an EV control mode, and (iii) a power control mode. A sets of tasks on a critical path of the task graph are required to be performed at full speed (corresponding to 100% of frequency), and the MT1 assigned to PG0, and the MT3 assigned to PG1 are performed at a maximum frequency.

However, since the MT3 requires a calculation result of the MT1, after the PG1 has performed the MT2, the PG1 becomes in a busy wait state for a synchronism until when (i) the PG0 stores an output data of the MT1 to a distributed shared memory on the PG1 and (ii) sets the synchronous flag notifying termination of the MT1 on the distributed shared memory.

Since the busy wait state consumes power, the automatic parallelizing compiler 1 may perform the MT2 at a low frequency and/or a low electric power (as described in the EV control), or when the automatic parallelizing compiler 1 has a sufficient latency time to perform a power supply cutoff, the automatic parallelizing compiler 1 intercepts a power source of the PG1 temporarily (as described in the power control).

Figure 11:
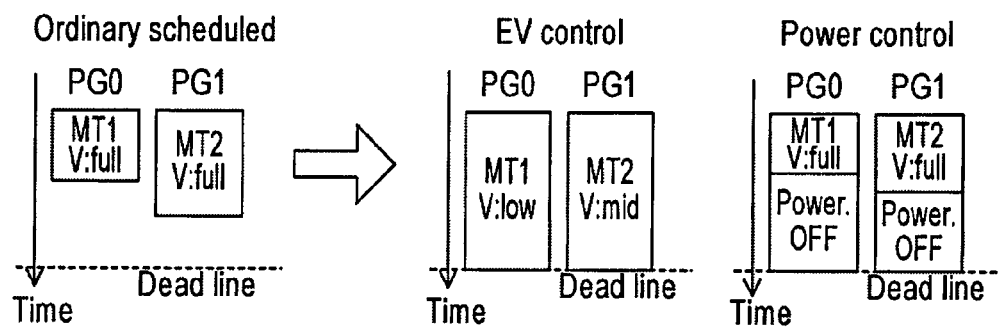
FIG. 11 is a drawing illustrating a running state of the macro task assigned to each processor group in a real time mode.

FIG. 11 illustrates a realtime execution mode (or a realtime processing mode) with dead line constraints. In an ordinary scheduled result, PG0 and PG1 wait after a termination of the processing and consume power in a wait period. Therefore, in order to reduce (or eliminate) the power consumption in a wait period from an termination of the processing to a dead line, the frequency of the MT1 is reduced to one fourth, and the frequency of the MT2 is reduced to half to execute at low electric power (as described in an EV control), or each of the PGs is stopped by a clock gating or a power gating (as described in a power control).

In the real time execution mode, the automatic parallelizing compiler 1 considers a state transition overhead of a power supply, and automatically selects a proper power mode in heuristics (referring to reference 6: Japanese patent No. 4082706).

1-8. Generation of Parallelizing Program

A parallelizing program in the automatic parallelizing compiler 1 may be generated by an automatic parallelizing API in a manner of a source-to-source parallelizing such as a parallelizing C or a parallelizing FORTRAN (referring to reference 7: "Optimally Scheduled Advanced Multiprocessor Application Program Interface" WASEDA University, 2008).

In this case, so that the parallelizing program may be executable on various platforms, the automatic parallelizing compiler 1 converts a directive part of C or Fortran for each processor into a runtime library call by using an automatic parallelizing API standard translator described below. After converting into the runtime library call, the automatic parallelizing compiler 1 compiles a code for each processor with a sequential compiler to generate binaries (referred to a binary code or file), the binaries are linked each other, and a parallelizing program may be executable on a target multiprocessor.

1-9. Automatic Parallelizing API

The automatic parallelizing API is targeted to a multicore architecture for information appliance as described below. Therefore, it may be possible that the automatic parallelizing API performs a memory allocation of data, a data transfer using the DMA, a power control, a group barrier synchronization, and a real time control, which are required for a shared memory type multicore processor.

An example of the automatic parallelizing API is an intermediate expression between the automatic parallelizing compiler 1 and a compiler for a multicore architecture corresponding to a target. For example, the automatic parallelizing compiler 1 translates a program in Fortran 77 or a sequential C program, which is imposed a limitation on a pointer use or the like into a parallelizing FORTRAN or a parallelized C program, to which the automatic parallelizing API is added automatically. When the parallelizing program is operated on a server, the parallelizing program is compiled by the OpenMP compiler, so that an execution binary is generated.

When the parallelizing program is used in a multicore processor for the embedded system, an exclusive API interpreter generates a code including a runtime library, and the generated code is compiled by the sequential compiler, so that an execution binary may be generated.

In an example of the automatic parallelizing API in FIG. 12, "threadprivate", "distributedshared", and "onchipshared" represent memory allocation APIs, and designate a memory to which a variable is arranged.

In addition, "parallel subsections" represents the automatic parallelizing API, and, by arranging two "subsections", two threads are generated so that the processing is executable. In addition, "dma transfer" represents a data transfer API, and "dma contiguous parameter" represents an API representing a successive transfer by the DTU. Specifically, in the successive transfer API, a first argument represents a source address, a second argument represents a destination address, a third argument represents a transfer size, a fourth argument represents a flag variable set up at the time of a termination of a transfer, and a fifth argument represents a value set up to a flag.

1-10. Multicore Architecture and Automatic Parallelizing API Standard Translator The automatic parallelizing API standard translator implements a portability of the parallelizing program generated by the automatic parallelizing compiler 1. In order to cause a generated parallelizing program to operate in various architectures, the automatic parallelizing compiler 1 converts a generated code into the runtime library by the automatic parallelizing API standard translator, and it is possible that generate the parallelizing program adjusted to the various platforms.

In the multicore architecture described below, the automatic parallelizing compiler 1 and the automatic parallelizing API automatically perform a parallelizing of a sequential program and power control. However, so that the memory allocation API and the data transfer API of the automatic parallelizing API are used, an API interpreter for a platform to be a target is required to be prepared. A development of the API interpreter for each platform may be a heavy load in a state where a shortening of a development cycle and a facilitating of the development are required.

Therefore a part of a processing having a low dependence to the platform is provided as the automatic parallelizing API standard translator. The part of a processing having a low dependency to the platform includes a part where a directive and a source program is interpreted and changed, for example. Accordingly, when the runtime library including many embedded multicore processors and the runtime library that is relatively easily created are prepared for each of the platforms, it is possible that the parallelizing program is generated. As a result, in various multicore processors, it is possible that the automatic parallelizing compiler 1 performs the parallelizing and the power control very inexpensively.

An example of the multicore architecture for an information appliance, a structure of the automatic parallelizing API standard translator, and another example of the automatic parallelizing API standard translator, will be explained below.

1-11. Multicore Architecture

A local memory architecture, which is one of the memory architectures in the multicore processor, is different from a cache architecture. It is possible that the local memory architecture brings out a performance by explicitly performing a local memory management on software.

Figure 13:
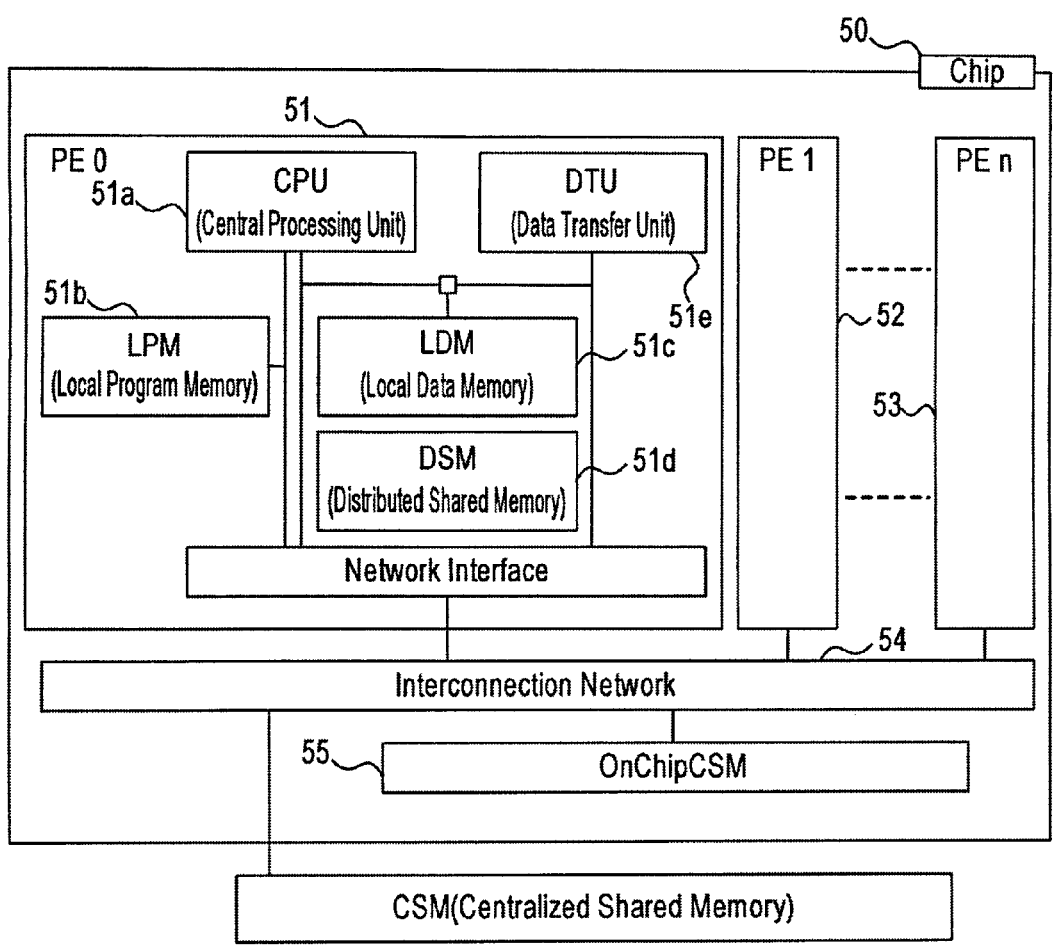
FIG. 13 is a block diagram illustrating a multicore architecture of the present embodiment.

The multicore architecture 50 in the present embodiment includes multiple processor elements (PEs 51, 52, 53) on one chip (referring to FIG. 13). Each of the PEs 51, 52, 53 includes a central processing unit (CPU 51*a*), a local program memory (LPM 51*b*), a local data memory (LDM 51*c*), a distributed shared memory (DSM 51*d*), and a data transfer unit (DTU 51*d*). The DTU 51*d* operates asynchronously with the CPU to perform the data transfer. All of the PEs on the chip is connected to an on-chip centralized shared memory (OnChipCSM 55) and an off-chip centralized shared memory by an interconnection network 54 such as a bus and a crossbar.

1-12. Structure of Automatic Parallelizing API Standard Translator

Figure 14:
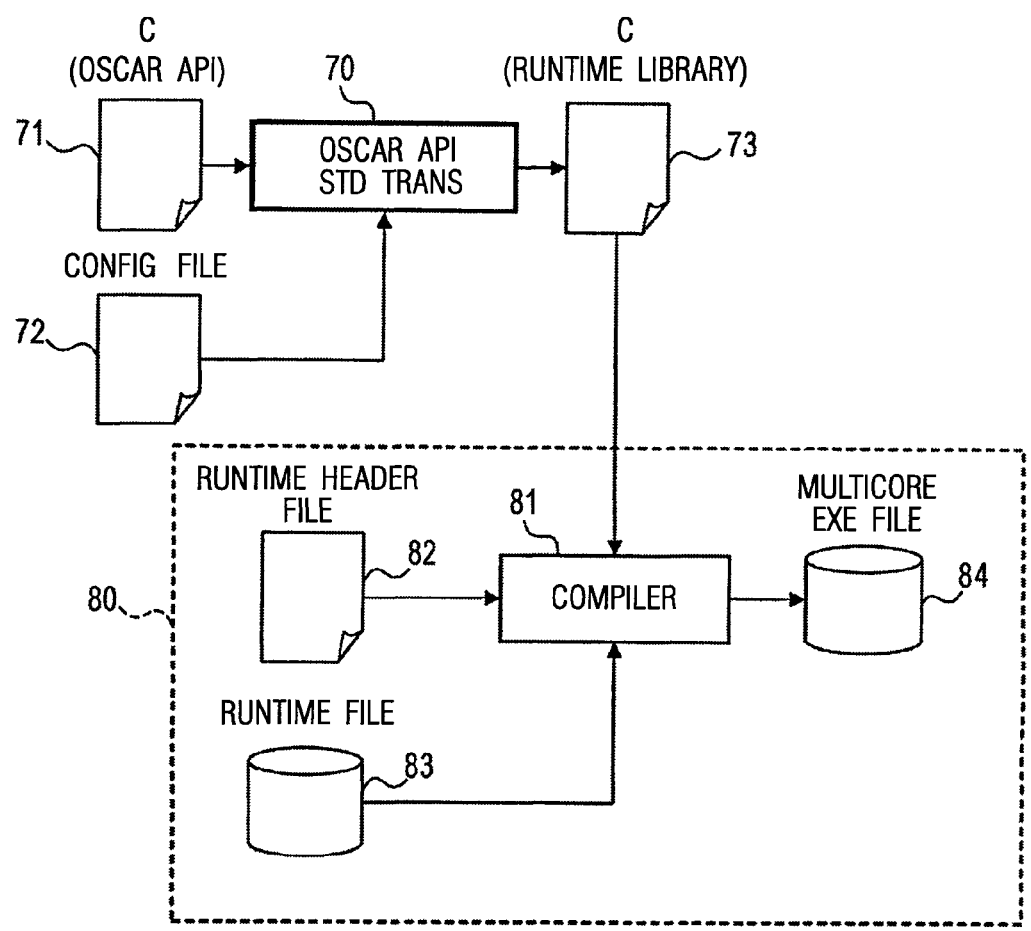
FIG. 14 is a drawing illustrating an automatic parallelizing API standard translator and a development environment.

The automatic parallelizing API standard translator 70 in the present embodiment receives a C program 71 (or a FORTRAN program) including the automatic parallelizing API as an input, and according to a setting of a configuration file 72, outputs a C program 73 (or a FORTRAN program) including the runtime library function (referring to FIG. 14).

The configuration file 72 may describe the setting for each of the architecture. The configuration file 72 may set (i) an address of the distributed shared memory (DSM), (ii) a "comment directive" which enables a propagation of an instruction to a native compiler, (iii) a conversion of a data transfer API and a power control API, (iv) "groupbarrier directive" implementing a barrier synchronism by arbitral groups between processor cores, (v) a matching of a module name and a module number, or the like.

The C program 73 including the outputted runtime library function is compiled by a compiler 81 of a development environment 80. The compiler 81 is a C compiler in the present embodiment. The compiled files are linked with runtime libraries 82, 83, so that an multicore execution file 84 is generated. The runtime library 82 is a runtime library header file, for example. The runtime library 83 is a runtime library file, for example. The development environment 80 is used for each of multicore architectures.

1-13. Conversion to Runtime Library Call

A directive of the automatic parallelizing API is described by "pragma" in a C program. The directive of the automatic parallelizing API is converted into the runtime library function by the automatic parallelizing API standard translator.

(Parallel Execution Directive)

In the directive of the automatic parallelizing API in FIG. 15, a "parallel subsections directive" generates four threads. As described in a source program of FIG. 16, in the automatic parallelizing API standard translator, a program part executed as the thread is extracted as functions having "thread_function_000-003". Among the extracted functions, "thread_function_001-003" is executed as threads by an "oscar_thread_create function", and the "thread Junction_000" is executed as a normal function. The "oscar_thread_join" function performs a queuing of a termination of threads.

When a "pthread library" is usable in the platform, it may be possible to implement an "oscar_thread_create" and an "oscar_thread_join" by using a pthread create and a pthread join, respectively.

1-14. Assignment of Memory Allocation Attribute

The memory allocation assignment such as a "thread private directive" or the like is unrealizable by the runtime library. Therefore, it is necessary to convert the memory allocation assignment into a description of a memory attribute assignment for a native compiler.

For example, a description "#pragma oscar onchipshared (var1)" arranges a variable "var1" to an on-chip centralized shared memory ("onchipshared directive").

When gcc is used as the native compiler, the above description is converted into a description "int_attribute ((subsection ("OSCAR_SHARED"))) var1". In the converted description, the variable "var1" is arranged into an "OSCAR SHARED section" by an "attribute description". By arranging the "OSCAR SHARED" section to the on-chip centralized shared memory by the configuration file of a linker form for an object platform, the variable "var1" is arranged to the on-chip centralized shared memory.

2. Parallelizing Procedure and Technique of Vehicle Control Program

A feature of a vehicle control program, which is automatically generated by a model based design, will be described, and a parallelizing technique by the automatic parallelizing compiler 1 will be explained.

Specifically, the automatic parallelizing compiler 1 is configured from the conditional branching and the assignment statement, and performs an inline expansion and a renaming with respect to the vehicle control program with a fine processing, and the parallelism is extracted. The automatic parallelizing compiler 1 performs the task fusion for hiding a conditional branching in order to keep a real time nature, and performs a static scheduling to reduce the overhead. In addition, the automatic parallelizing compiler 1 may use the profile automatic feedback function in order to perform the static scheduling at a real cost.

2-1. Operating Environment of Automatic Parallelizing Compiler

Figure 17:
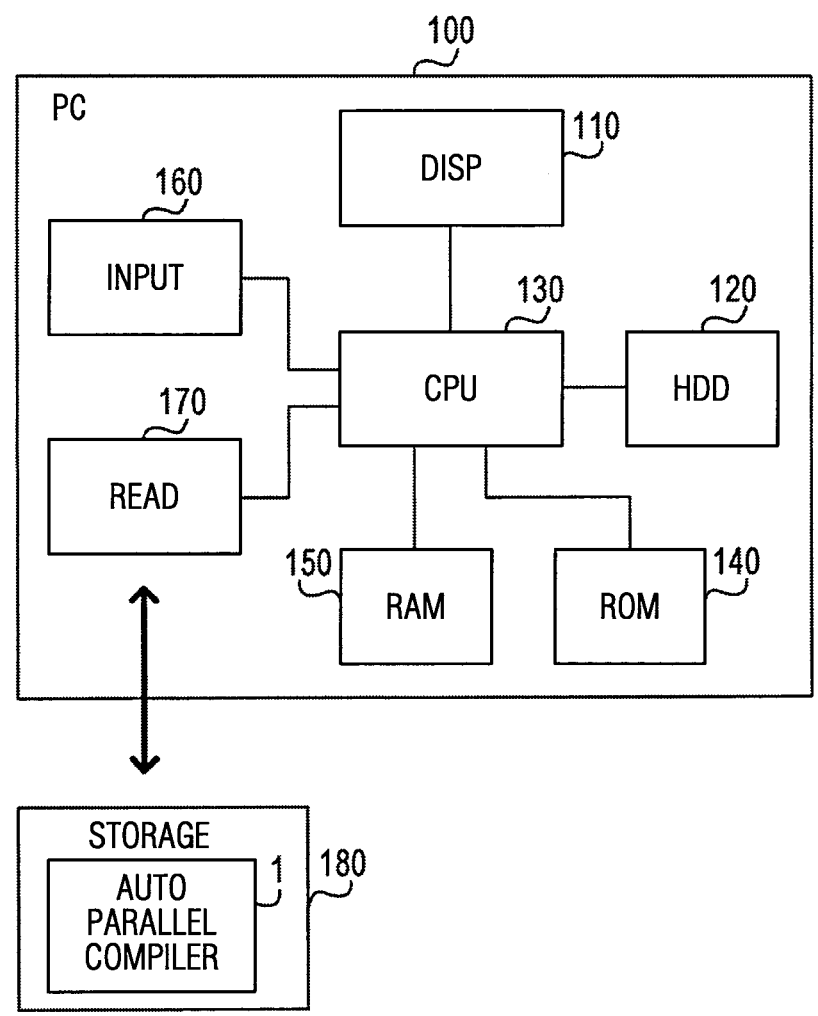
FIG. 17 is a block diagram illustrating a configuration of a PC, in which an automatic parallelizing compiler has been installed.

The automatic parallelizing compiler 1 is provided to a user in a state stored into a storage medium 180 corresponding to an optical disk such as DVD, CD-ROM, or the like, a USB memory, a memory card (registered trademark), a magnetic disc, a semiconductor memory, or the like (referring to FIG. 17). Alternatively, the automatic parallelizing compiler 1 may be provided to the user via a network.

A personal computer (PC) 100 with which the automatic parallelizing compiler 1 has been installed operates as an automatic parallelizing compile apparatus. The PC 100 includes a display 110, HDD 120, CPU 130, ROM 140, RAM 150, an input device 160, a reading portion 170, or the like.

The display 110 displays a video image of a video signal received from the CPU 130 for the user. The input device 160 includes a keyboard, a mouse, or the like. When the user operates the input device 160, the input device 160 outputs a signal according to the operation to the CPU 130.

The reading portion 170 reads a data from the storage 180 where the automatic parallelizing compiler 1 or the like has been stored. The RAM 150 is a readable and writable volatile memory, the ROM 140 is a read only non-volatile memory, and the HDD 120 is a readable and writable non-volatile memory. In the ROM 140 and the HDD 120, a program or the like that the CPU 130 reads and executes are stored in advance.

When the CPU 130 executes the program stored in the ROM 140 or the HDD 120, the RAM 150 functions as a storage region for temporarily saving a program and a working data.

The CPU 130 reads and executes an operating system (OS) from the HDD 120, and executes various programs stored on the HDD 120 as a process on the OS. The CPU 130 receives a signal input from the input device 160 in the process when the signal input is required, outputs the video signal to the display 110, and controls a readout/writing of the data with respect to the RAM 150 or the HDD 120.

In the PC 100, the automatic parallelizing compiler 1 which has been read from the storage 180 via the reading portion 170 is installed. The automatic parallelizing compiler 1 is one of applications saved in the HDD 120 and executed as a process on the OS.

Incidentally, the automatic parallelizing compile apparatus is used for a development of the parallelizing program for the embedded system for an onboard apparatus or the like. However, the automatic parallelizing compiler is not limited to this type of the development, and for example, the automatic parallelizing compiler according to the present disclosure may be used for a development of various parallelizing programs for embedded systems for various applications such as an information appliance, or the like and may be used for a development of a parallelizing program for other applications other than the embedded system.

2-2. Procedure of Parallelizing

In the present embodiment, the automatic parallelizing compiler 1 generates a parallelizing program from a vehicle control program (a sequential program) automatically generated by the model based design using Matlab (registered trademark) and Simulink (registered trademark) of MathWork, for example.

Specifically, by using an embedded coder, a vehicle control program, which has been described in C language, is automatically generated from a vehicle control model, which has been developed by the model base design with the Simulink. The automatic parallelizing compiler 1 performs the automatic parallelizing processing, analyzes the vehicle control program 250 and generates the parallelizing program 251 (referring to FIG. 18).

In the automatic parallelizing processing, the automatic parallelizing compiler 1 performs an inline expansion of the vehicle control program 250, and a renaming of a local variable in the vehicle control program 250 (S205). The automatic parallelizing compiler 1 divides the vehicle control program 250, which the above processing have been conducted, into the macro tasks, analyzes the data dependency and the control dependency to generate the MFG (S210).

In S214, the automatic parallelizing compiler 1 specifies a starting end task, which branches to a different macro task, based on the control dependency indicated by the MFG. In addition, the automatic parallelizing compiler 1 specifies a termination end task, which is the first macro task executed among macro tasks commonly executed in multiple sequential processings. The multiple sequential processings have one common starting end task as a starting point, and are parallelly executed.

In S215, the automatic parallelizing compiler 1 fuses (i) the specified starting task, (ii) the specified termination end task, in which the starting task is a starting point among the processings, and (iii) all macro tasks executed after an execution of the starting end task and executed before an execution of the termination end task and moves to a processing at S220. Incidentally, this processing is referred to as a task fusion.

Incidentally, by performing the task fusion, the MFG loses the control dependency. In order to break down a grain size of the macro task, it may be preferable that the termination end task is the first macro task executed among the macro tasks commonly executed in multiple sequential processings, as described in S214. The multiple sequential processings have the common starting end task as the starting point, and are parallelly executed. However, a manner to specify the terminating end is not limited to this manner, and therefore, one of the macro tasks, which are executed in the second and subsequent order among the multiple macro tasks, may be a termination end task to be specified.

In S220, based on the MFG after the task fusion, the automatic parallelizing compiler 1 analyzes the earliest executable condition of each macro task, and generates the MTG. The automatic parallelizing compiler 1 performs the static scheduling based on the MTG, assigns the macro tasks, which are executable in parallel, to different PEs, and generates the parallelizing program 251 (S225).

Incidentally, so that the parallelizing program 251 may be operated on various platforms, by using the automatic parallelizing API standard translator, the automatic parallelizing compiler 1 may convert a parallelizing program, to which the automatic parallelizing API has been added, into the parallelizing program, in which the runtime library has been implemented.

The automatic parallelizing compiler 1 generates the binary data 252 from the parallelizing program 251 (S230).

2-3. Feature of Vehicle Control Program

For example, the vehicle control program performing an engine control fundamentally includes an initialization function and a prime engine control calculation function repeatedly executed.

Figures 18, 19:
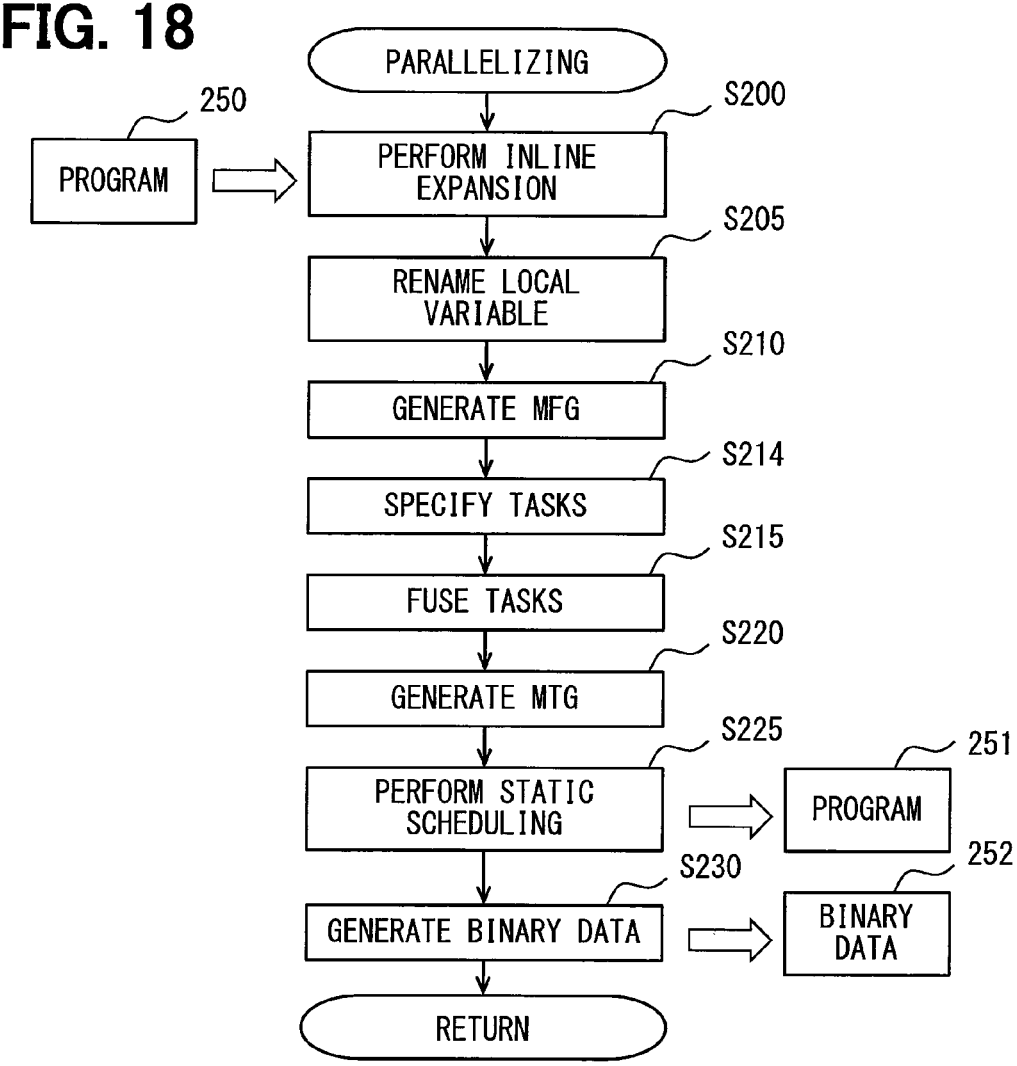
FIG. 18 is a flow chart of an automatic parallelizing processing.
FIG. 19 is a drawing illustrating an example of a vehicle control program.

The vehicle control program for the engine control, which is exemplified in FIG. 19, performs the real time control by repeatedly executing a "Model_step function". Since the dead line is short in the vehicle control, in the "Model_step function", a period of time of one cycle may be microsecond order at the longest, and therefore a grain size of a program is very fine. In the "Model_step function", all the processings corresponding to blocks described by a Simulink model are calculated.

Figure 20:
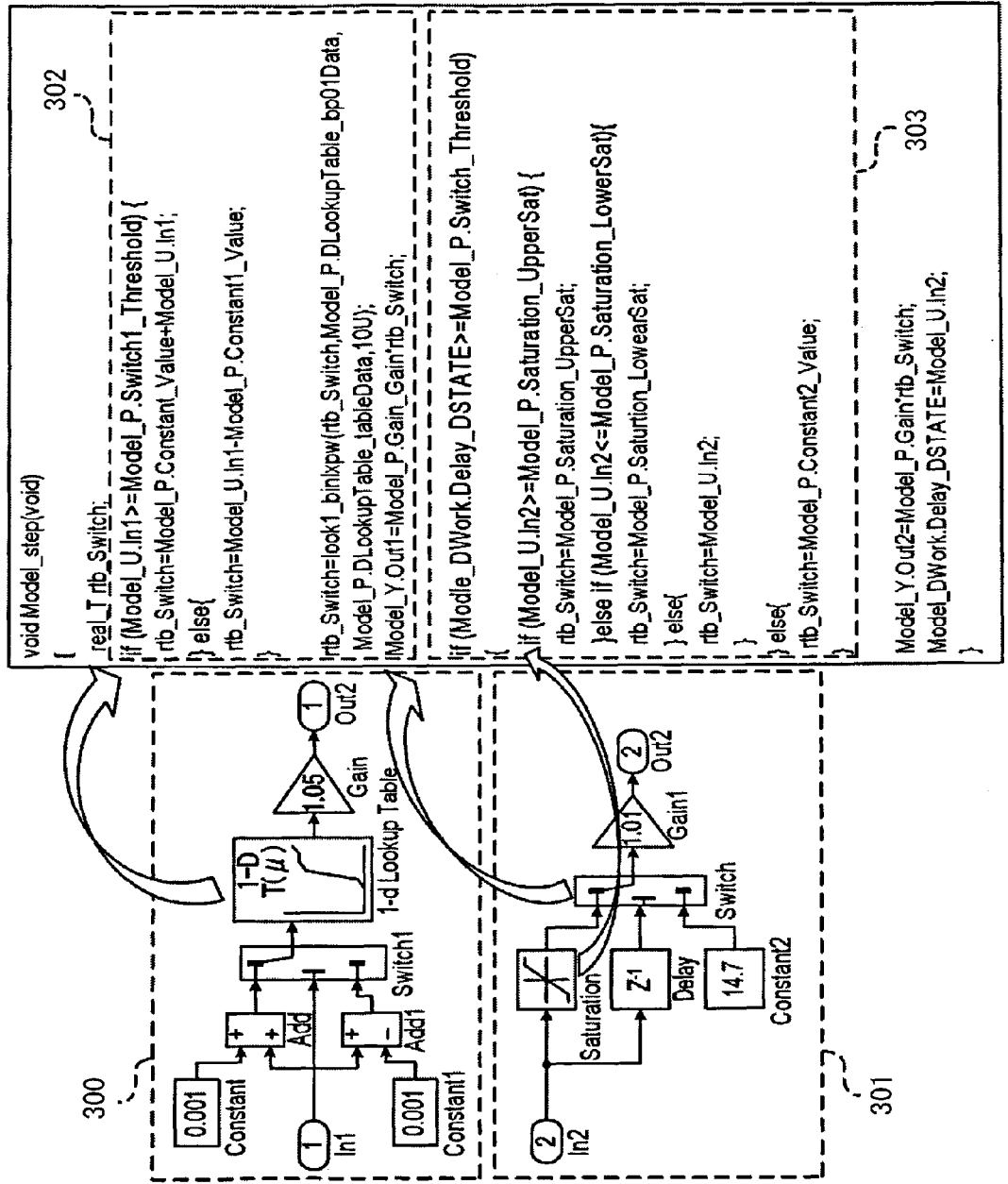
FIG. 20 is a drawing illustrating an example of the vehicle control model and a vehicle control program of C language automatically generated based on the vehicle control model.

FIG. 20 illustrates vehicle control models 300, 301 and a vehicle control programs 302, 303 in C language, the vehicle control programs 302, 303 being generated automatically based on the vehicle control models 300, 301. As described in FIG. 20, for example, a "Saturation block" in the model 301 is converted into a program of "if", "if else", and "else". The "Switch block" in the model 301 is converted into a program of "if" and "else."

Since the "Model_step function" in the vehicle control program corresponds to a control function on the vehicle control model, in the present embodiment, the control function is parallelized and accelerated.

One of features of the vehicle control program is that a loop, to which a conventional parallelizing compiler performs a parallelization as a subject, does not exist (or alternatively, there are only a few loops). As described in FIG. 20, in the vehicle control, since it is necessary to change a processing by a sensor information or the like, a designing is performed by abundantly using the "a Switch block" and the "Saturation block" to include a combination of a conditional branching sentence and an assignment statement.

Therefore, a parallelization on the iteration within the loop, which has been performed conventionally, may be inapplicable to the vehicle control program. Accordingly, in the automatic parallelizing processing, the automatic parallelizing compiler 1 extracts the parallelizing in the Simulink model level by using the coarse grain task parallelizing function.

Figure 21:
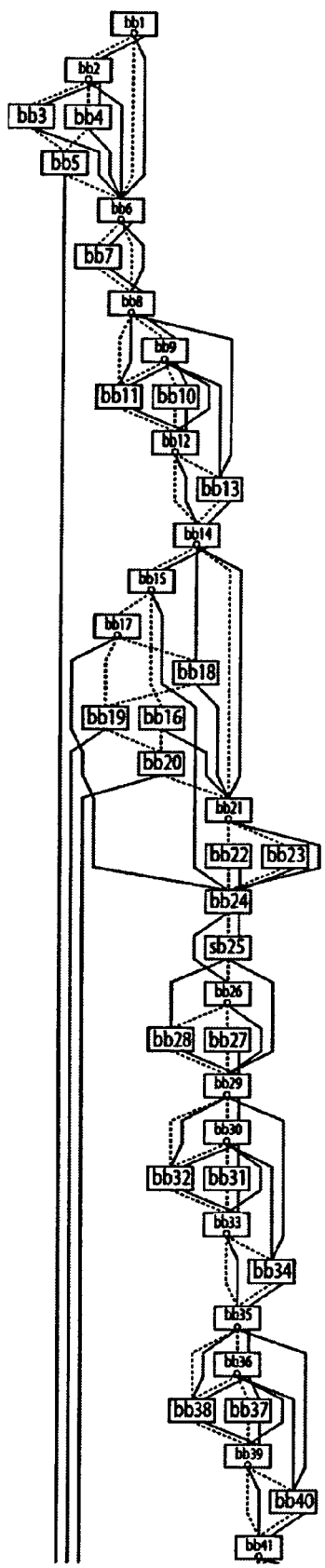
FIG. 21 is a drawing illustrating an example of the macro flow graph after an inline expansion.

Since the control function generated by the model based design lacks a parallelism between subroutines and the parallelism is required to be pulled out finely, the automatic parallelizing compiler 1 performs the inline expansion (corresponding to S200 in the automatic parallelizing processing). An example of the MFG after the inline expansion is described in FIG. 21. As described in the MFG in FIG. 21, in the sequential program generated by the model based design, there is not a loop to which a parallelizing is applicable having a large processing cost, and alternatively, there are many basic blocks having the conditional branching, represented by a small circle in a node. Incidentally a symbol "BB" in the MFG represents a basic block, a symbol "SB" represents a subroutine block, and a symbol "EMT" represents an end of a macro task.

The processing time of each the nodes is about tens of clock cycles at the longest, the processing is very fine, and it is important to reduce the overhead as much as possible. This type of the processing is difficult to parallelize by the conventional technique.

2-4. Restructuring Technique and Parallelizing Technique of Vehicle Control Program The automatic parallelizing compiler 1 according to the present disclosure extracts the parallelism from the vehicle control program automatically generated from the Simulink model, and performs a restructuring of a program so that a parallelizing is performed in a state where the overhead is lower.

(Inline Expansion of Function (S200 of Automatic Parallelizing Processing))

The vehicle control program has a fine processing, and a parallelizing with the coarse grain size is difficult. Therefore, the vehicle control program of the present embodiment may utilize the parallelism in the subroutines in the control function effectively. The automatic parallelizing compiler 1 performs the inline expansion of the subroutines in the control function. That is, a description of calling the subroutine is transposed to a description of a processing defined by the subroutine.

Figure 22:
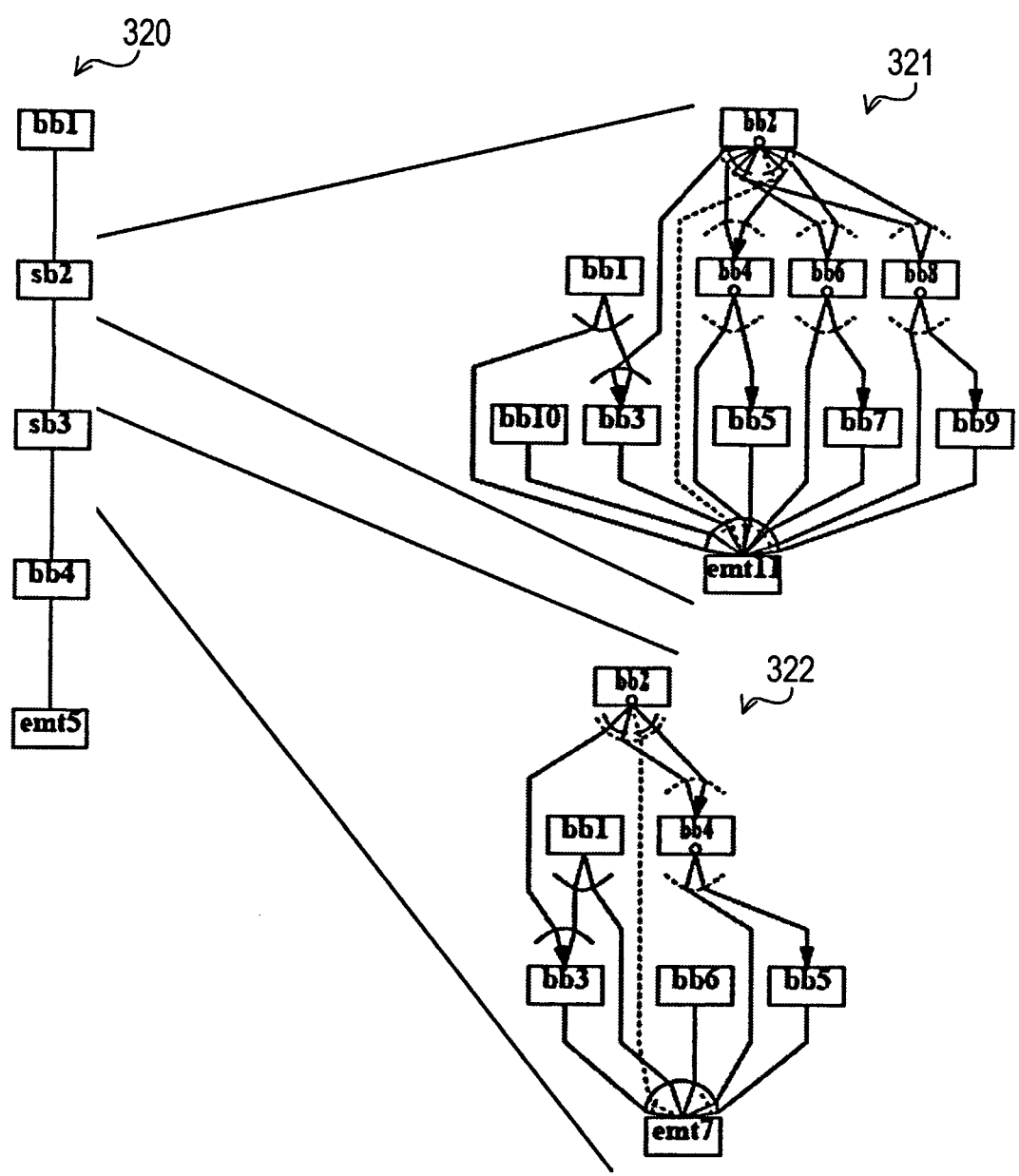
FIG. 22 is a drawing illustrating an example of the macro task graph before the inline expansion.
Figure 23:
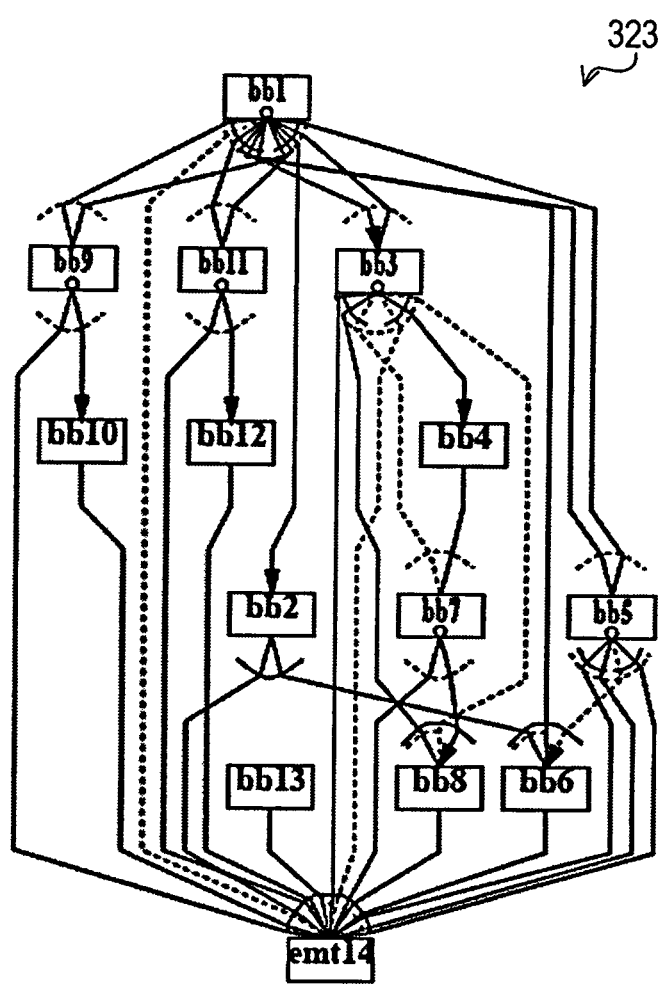
FIG. 23 is a drawing illustrating an example of the macro task graph after the inline expansion.

As an example that the inline expansion may be effective, in the MTG 320 of FIG. 22, a "sb2" and a "sb3" have dependency and the parallelism does not exist. However, as described in the MTG 321 of the "sb2" and the MTG 322 of the "sb3", since the parallelism exists in internal processings of the subroutines, the parallelism of the subroutines may be used by performing the inline expansion of the "sb2" and the "sb3". Incidentally, FIG. 23 illustrates the MTG 323 after performing the inline expansion of the "sb2" and the "sb3."

(Renaming of Local Variable (S205 of Automatic Parallelizing Processing))

In the vehicle control program automatically generated from the Simulink model, in order to reduce the amount of ROM, a local variable is repeatedly used in many parts of the processing. As an example, in the vehicle control program in FIG. 24, a local variable "tmp" is repeatedly used in program parts 330, 331.

Accordingly, when it is specified that a data dependency exists in the parallelism analyses, the parallelism may not be brought out enough. Therefore, in S205 of the automatic parallelizing processing, the local variable used repeatedly is renamed.

Specifically, the automatic parallelizing compiler 1 specifies multiple processing blocks, in which a local variable having the same name is used, in the control function, and changes the vehicle control program so that a local variable having a unique name is used in each of the specified processing block.

Incidentally, the processing blocks may be a statement of a loop processing, a statement of a branching process such as a "if statement", a switch-case statement, or the like, and an aggregate of descriptions configured from the above statements and an assignment statement accompanying the above statement, or the like.

Furthermore, the processing block may be an aggregate of a description corresponding to each block in the Simulink model generated the vehicle control program, for example.

For example, in the vehicle control program in FIG. 24, a local variable "tmp" having the same name is used in the processing blocks 330,331 including an if-else statement, an assignment statement, and a function call. Therefore, by renaming the local variable "tmp", the name of the local variable accessed by the processing block 330 is changed into "tmp1", and the name of the local variable accessed by the processing block 331 is changed into "tmp2", for example.

Alternatively, when the vehicle control program is automatically generated from the Simulink model using the Embedded Coder, the Embedded Coder may be set not to use a local variable repeatedly by a setting. In the setting where the local variables are not used repeatedly, a local variable with another name is used for each description corresponding to each block. Accordingly, even when the processing of S205 is not performed, it is possible to prevent an unnecessary data dependency between the macro tasks.

(Task Fusion for Conditional Branching Hiding (S215 of Automatic Parallelizing Processing))

As described above, since the loop structure does not exist in the vehicle control program, it may be possible to apply the near fine grain parallelizing or the coarse grain task parallelizing. In order to relatively reduce the execution overhead of the vehicle control program, the automatic parallelizing compiler 1 uses the coarse grain task parallelizing.

In the vehicle control program, a cost of each of the macro tasks is about several tens of clocks. When the automatic parallelizing compiler 1 performs a dynamic scheduling, an overhead of from several 10 clocks to several 100 clocks occurs. Therefore, the dynamic scheduling may be unsuitable for the vehicle control program.

However, since a branch destination of the macro task with the conditional branching is dynamically determined at the time of the execution, a static scheduling assigning a processor core at the compile time may not be applied to the macro task with the conditional branching.

In S215 of the automatic parallelizing processing of the present embodiment, by using a task fusion algorithm, the task fusion is performed to fuse a macro task with the conditional branching and a macro task, which is placed at a branch destination, into one coarse grain task (the block task).

Figure 25:
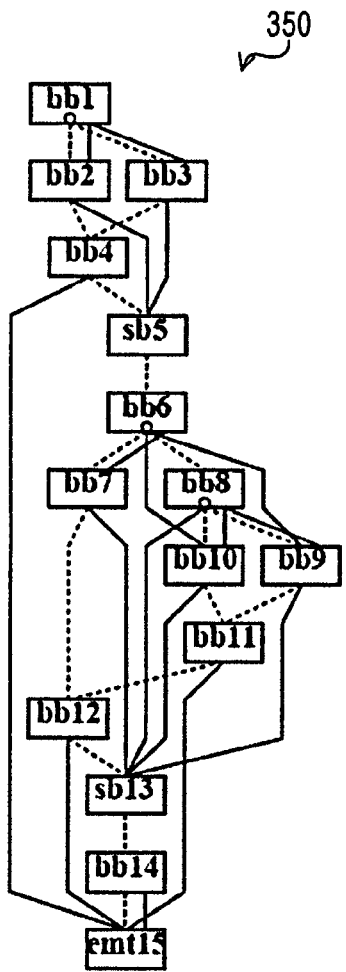
FIG. 25 is a drawing illustrating an example of the macro flow graph before a task fusion.
Figure 26:
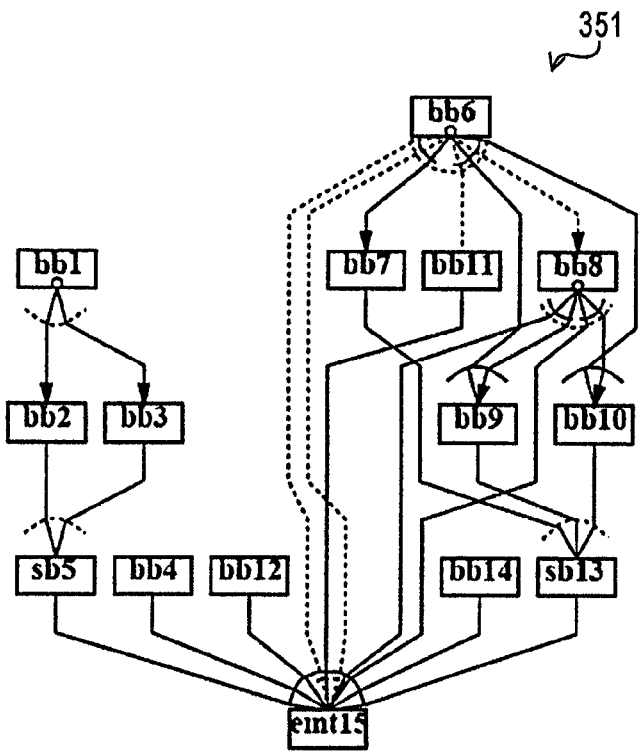
FIG. 26 is a drawing illustrating an example of the macro task graph before the task fusion.
Figure 27:
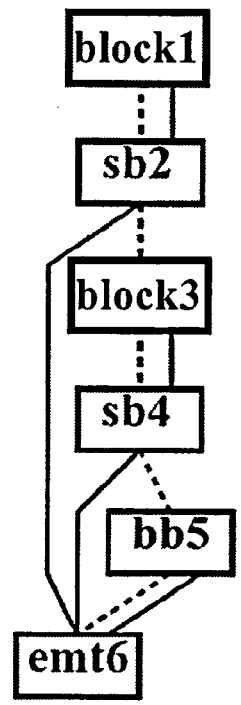
FIG. 27 is a drawing illustrating an example of the macro flow graph after the task fusion.
Figure 28:
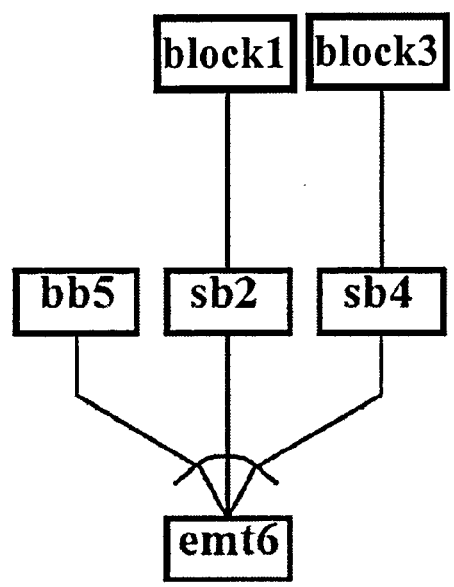
FIG. 28 is a drawing illustrating an example of the macro task graph after the task fusion.

Specifically, a MTG 351 (referring to FIG. 26) is generated from a MFG 350 (referring to FIG. 25). When the task fusion is performed to the MFG 350, a MFG 352 (referring to FIG. 27) is generated, and a MTG 353 (referring to FIG. 28) is generated from the MFG 352.

In the task fusion for the MFG 350, a "bb1" and a "bb6", which have conditional branching, are specified as starting end tasks. As a series of processings including the "bb1" as the starting point, a processing including the "bb1", a "bb2", a "bb4", or the like, and a processing including the "bb1", "bb3", "bb4", or the like, are specified. As described in FIG. 25, the "bb4" corresponds to the first macro task commonly executed among the macro tasks executed in the series of the processings. The "bb4" is specified as a termination end task.

The "bb1", which is the starting end task, the "bb4", are the termination end task, a "bb2", and a "bb3" are fused into one macro task ("Block 1" of MFG 352), since the "bb2" and the "bb3" are executed after the execution of the "bb1" and before the execution of the "bb4".

In the task fusion for the MFG 350, as a series of processings including the "bb6" as the starting point, a processing including the "bb6", a "bb1", a "bb12", or the like, and another processing including the "bb6", a "bb8", a "bb10", a "bb11", a "bb12", or the like are specified. The "bb12" corresponds to the first macro task commonly executed among macro tasks executed in the series of the processings. The "bb12" is specified as the termination end task.

The "bb6", which is the starting end task, the "bb12", which is the termination end task, and the "bb7-11" are united with one macro task ("Block 3" of MFG 352). The "bb7-11" are executed before the "bb12" and after the "bb6."

Since the conditional branching does not exist in the MFG 352 generated by the task fusion (i.e., a control dependency does not exist), it is possible to perform the static scheduling.

3. Performance Evaluation

A result of a performance evaluation of the onboard apparatus on which the multicore processor is mounted will be explained. The multicore processor is operated by the parallelizing program, which is generated by the automatic parallelizing compiler 1 of the present embodiment.

3-1. Configuration of Onboard Apparatus

Figure 29:
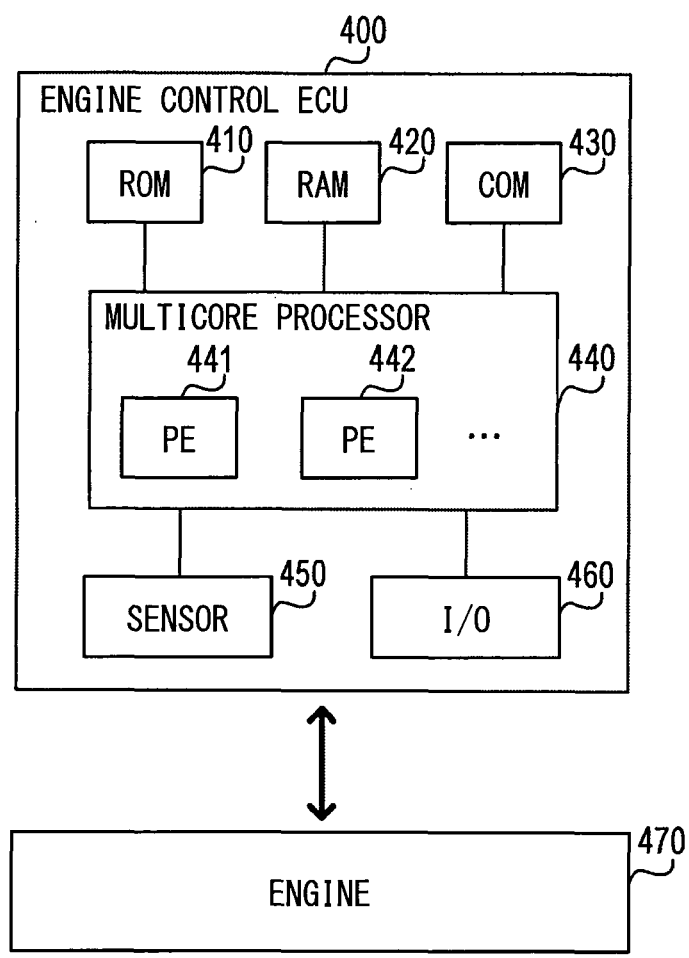
FIG. 29 is a block diagram illustrating a configuration of an engine control ECU.

A configuration of an engine control ECU 400 operated by the parallelizing program generated by the automatic parallelizing compiler 1 will be explained (referring to FIG. 29).

The engine control ECU 400 includes ROM 410, RAM 420, a communication portion 430, a multicore processor 440, a sensor part 450, and an input/output port 460, or the like. The ROM 410 saves a binary data of the parallelizing program generated by the automatic parallelizing compiler 1. The multicore processor 440 operates according to the binary data, and integrally controls the engine control ECU 400.

The RAM 420 is accessed by the multicore processor 440. The communication portion 430 communicates with other ECUs connected via an in-vehicle LAN, or the like.

The sensor part 450 includes various sensors for detecting a condition of the engine 470. The input/output port 460 transmits and receives various signals for controlling the engine 470.

The multicore processor 440 has multiple PEs 441, 442. The multicore processors 440 may be a RP2, which is a multicore for an information appliance, a V850E2R of Renesas Electronics, or the like.

The RP2 is a homogeneous multicore mounting with eight SH4a (SH-X3) cores, and each of the cores has a central processing unit (CPU), a local program memory (LPM), and a local data memory (LDM) and a distributed shared memory (DSM). Each of the cores includes a data transfer unit (DTU), which asynchronously operates with the CPU and performs a data transfer.

Incidentally, the parallelizing program is not limited to the engine control ECU 400, and other ECUs, on which the multicore processor is mounted, may be operated by the parallelizing program generated by the automatic parallelizing compiler 1. Other ECUs may include an ECU of a navigation devices or the like, for example. Alternatively, the parallelizing program is not limited to the onboard apparatus, and electronic devices such as an information appliance, on which the multicore processor is mounted, may be operated by the parallelizing program generated by the automatic parallelizing compiler 1.

3-2. Evaluation Result of Engine Control ECU

A model of the control system of the engine control ECU 400 has four subsystems including an ECU model, a Driver model, a Car model, and a Sensor model. A result of a performance evaluation of the whole control system of the engine control ECU 400 and a performance evaluation of each of the subsystems will be explained in a case where the RP2 or the V850E2R is used as the multicore processor 440.

(Performance Evaluation of RP2)

The RP2 parallelly operating with two cores, and the RP2 sequentially operating with one core operate the ECU model, the Driver model, the Sensor model, and the Car model. Incidentally, a program generated from the models is optimized in size precedence.

With respect to the ECU model, the execution time in one cycle is 119 microseconds in the RP2 having one core. On the contrary, the execution time in one cycle is shortened to 63 microseconds in the RP2 having two cores. With respect to a speed improvement rate, a performance of the RP2 having two cores is improved by 1.89 times compared with the RP2 having one core.

With respect to the Driver model, the execution time in one cycle is 41 microseconds in the RP2 having one core. On the contrary, the execution time in one cycle is shortened to 27 microseconds in the RP2 having two cores. With respect to a speed improvement rate, a performance of the RP2 having two cores is improved by 1.52 times compared with the RP2 having one core.

With respect to the Sensor model, the execution time in one cycle is 40 microseconds in the RP2 having one core. On the contrary, the execution time in one cycle is shortened to 26 microseconds in the RP2 having two cores. With respect to a speed improvement rate, a performance of the RP2 having two cores is improved by 1.52 times compared with the RP2 having one core.

With respect to the Car model, the execution time in one cycle is 2382 microseconds in the RP2 having one core. On the contrary, the execution time in one cycle is shortened to 1291 microseconds in the RP2 having two cores. With respect to a speed improvement rate, a performance of the RP2 having two cores is improved by 1.84 times compared with the RP2 having one core.

The whole control system of the engine control ECU 400 is operated by the RP2 parallelly operating four cores or the RP2 sequentially operating having two cores. Incidentally, a program generated from the model of the whole control system is optimized in size precedence.

In the RP2 having one core, the execution time in one cycle is 4161 microseconds. In the RP2 having two cores, the execution time in one cycle is 2397 microseconds. In the RP2 having four cores, the execution time in one cycle is shortened to 1273 microseconds. With respect to a speed improvement rate, a performance of the RP2 having two cores is improved by 1.74 times compared with the RP2 having one core. A performance of the RP2 having four cores is improved by 3.27 times compared with the RP2 having one core.

(Performance Evaluation of V850E2R)

The ECU model has been operated by the V850E2R parallelly operating with two cores or by the V850E2R sequentially operating with one core. Incidentally, a program generated from the ECU model is optimized in size precedence.

With respect to a speed improvement rate, a performance of the V850E2R having two cores is improved by 1.91 times compared with the V850E2R having one core.

3-3. Evaluation Result in Engine Fuel Injection Control Model

A result of a performance evaluation when the parallelizing program generated from an engine fuel injection control model by the automatic parallelizing compiler 1 is operated by the RP2 and the V850E2R will be explained.

(Performance Evaluation of RP2)

The engine fuel injection control model is operated by the RP2 parallelly operating with four cores, by the RP2 parallelly operating with two cores, or by the RP2 sequentially operating with one core. Incidentally, a program generated from the engine fuel injection control model is optimized in size precedence.

The execution time in one cycle is 157 microseconds in the RP2 having one core. On the contrary, in the RP2 having two cores, the execution time in one cycle is 87 microseconds. In the RP2 having four cores, the execution time in one cycle is shortened to 42 microseconds. With respect to a speed improvement rate, a performance of the RP2 having two cores is improved by 1.81 times compared with the RP2 having one core, and a performance of the RP2 having four cores is improved by 3.76 times compared with the RP2 having one core.

(Performance Evaluation of V850E2R)

The engine fuel injection control model is operated by V850E2R parallelly operating with two cores, and V850E2R sequentially operating with one core. Incidentally, a program generated from the engine fuel injection control model is optimized in size precedence.

With respect to a speed improvement rate, a performance of the V850E2R having two cores is improved by 1.79 times compared with the V850E2R having one core.

(Other Embodiments)

(1) The automatic parallelizing compiler 1 of the present embodiment performs the inline expansion of the sequential program of the automatic parallelizing processing in S200, and renames the local variable in S205. The inline expansion and renaming may not be performed or either of the processings may be performed. In such a case, the same effects may be obtained according to a configuration of the sequential program.

(2) The automatic parallelizing compiler 1 of the present embodiment may optimize the generated parallelizing program for performing speculative execution. According to this optimization, a performance of the parallelizing program may be more improved.

S200 of the automatic parallelizing processing corresponds to an example of performing an inline expansion (or a replacement procedure) of the parallelizing compile method. S205 corresponds to an example of renaming (or a renaming procedure). S210 corresponds to an example of diving (or a division procedure) of a parallelizing compile method and the parallelizing compiler, and a division device (or means) of the parallelizing compile apparatus. S214 corresponds to an example of specifying (or a specifying procedure) of the parallelizing compile method and the parallelizing compiler, and a specifying device (or a specifying means) of the parallelizing compile apparatus. S215 corresponds to an example of fusing (or a fusion procedure) of the parallelizing compile method and the parallelizing compiler, and a fusion device (or a fusion means) of the parallelizing compile apparatus.

S220 corresponds to an example of extracting (or an extracting procedure) of the parallelizing compile method and the parallelizing compiler, and an extraction device (or means) of the parallelizing compile apparatus. S225 corresponds to an example of performing a static scheduling (or a scheduling procedure) of the parallelizing compile method and the parallelizing compiler, and a scheduling device (or a scheduling means) of the parallelizing compile apparatus.

S225 and S230 correspond to an example of generating (or a generation procedure) of the parallelizing compile method and the parallelizing compiler, and a generation device (or a generation means) of the parallelizing compile apparatus. The PE, the PG, and the processor core correspond to an example of a processor unit.

The engine control ECU 400 corresponds to an example of an onboard apparatus.

According to the present disclosure, a parallelizing compile method includes dividing a sequential program for an embedded system for an onboard apparatus into a plurality of macro tasks according to a predetermined method, the sequential program being executed by a single processor system; and specifying, based on a control dependency between the macro tasks, (i) a starting end task of the macro tasks as a starting point, wherein the starting end task has a processing branched into different ones of the macro tasks, and (ii) a termination end task of the macro tasks, wherein the termination end task is either one of the macro tasks commonly executed among a plurality of series of processings, which are sequentially executed from the starting end task.

Furthermore, the parallelizing compile method includes fusing (i) the starting end task specified by the specifying, (ii) the termination end task executed from the starting end task in the processings, and (iii) a group of the macro tasks executed after execution of the starting end task and before execution of the termination end task into a new macro task; and extracting a group of new macro tasks, which are parallelly executable by a plurality of processor units included in a multiprocessor system mounted to the onboard apparatus, from the new macro tasks fused in the fusing, based on a data dependency.

Furthermore, the parallelizing compile method includes performing a static scheduling assigning the new macro tasks to the processor units, so that the group of new macro tasks is parallelly executable by the processor units; and generating a parallelizing program executed by the multiprocessor system, based on a result of the static scheduling.

As a technique to parallelize a sequential program, a multi grain parallel processing is known, in which a coarse grain parallelizing, a medium grain parallelizing, and a near fine grain parallelizing performed are combined and performed. In a sequential program for an embedded system for an onboard apparatus, the loop structure does not exist, or a very few loop structure exists. In addition, the loop structure is configured from a conditional branching and an assignment statement. Therefore, a medium grain parallelizing may be inapplicable to the sequential program. The medium grain parallelizing corresponds to a parallelizing in an iteration level in the loop. Furthermore, since the processing is very fine, an overhead is required to reduce when the processing is parallelly operated in the multiprocessor system.

In the parallelizing compile method disclosed in the present disclosure, a sequential program for an embedded system for an onboard apparatus is divided into macro tasks, a parallelism of each of the macro tasks is extracted, and a coarse grain parallelizing is performed to assign the macro tasks, which are parallelly executable, into different processor unit. The sequential program is executed by a single processor system.

Since a cycle of each macro task generated from the sequential program for the embedded system for the onboard apparatus is short, when a dynamic scheduling is used, the overhead may be enlarged and acceleration may be difficult. A static scheduling may not be used to each of the macro tasks, when a control dependency exists between the macro tasks. The processing time of each node is about tens of clock cycles at the longest, the processing is very fine, and it is important to reduce an overhead maximally.

In the parallelizing compile method according to the present disclosure, after the multiple macro tasks being in the control dependency is fused into one task in the fusion, the static scheduling is performed, so that the macro tasks, which are parallelly executable, are assigned into different processor units.

According to this configuration, it is possible to automatically generate a parallelizing program, which performs a processing at high speed, from the sequential program for the embedded system for the onboard apparatus. Therefore, compared with a parallelizing of the sequential program, which is performed by a person, it is possible to reduce a development period and a development cost, and to generate a parallelizing program for the embedded system for the onboard apparatus, the parallelizing program being reliable.

Incidentally, the present disclosure may be realized by various embodiments in addition to the parallelizing compile method explained in the present embodiment. An example of other embodiments includes a parallelizing compiler which is a program for causing a computer to implement the parallelizing compile method, a parallelizing compile apparatus for implementing the parallelizing compile method, or the like. In addition, an example of the present disclosure may be an onboard apparatus or the like having a multiprocessor system, which is operated by a program generated by the parallelizing compile method.

It is noted that a flowchart or a processing of the flowchart in the present application includes steps (also referred to as sections), each of which is represented, for example, as S100. Further, each step may be divided into several subsections, and several sections may be combined into a single section. Furthermore, each of the configured sections may be also referred to as a device, module, or means. Each or any combination of steps explained in the above may be achieved as (i) a software steps in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A parallelizing compile method comprising: dividing a sequential program that controls an embedded system into a plurality of macro tasks according to a predetermined method, the sequential program being executed by a single processor system; generating a macro flow graph based on analysis of a control flow and a data dependency among the macro tasks; specifying, based on the control flow indicated in the macro flow graph, at least one pair of a starting end task and a termination end task, wherein the starting end task is a macro task that has a conditional branch, and the termination end task is one of macro tasks which are commonly executed among a plurality of a series of processings of the macro tasks to be sequentially executed from the starting end task as a start point; fusing (i) the starting end task specified by the specifying, (ii) the termination end task specified by the specifying, and (iii) a group of the macro tasks executed after execution of the starting end task and before execution of the termination end task into a block task so as to hide the conditional branch of the starting end task into the block task, wherein a plurality of block tasks are provided; extracting, based on the data dependency among the macro tasks including the block tasks after the fusing, parallelly-executable macro tasks that are parallelly-executable by a plurality of processor units included in a multiprocessor system; performing a static scheduling assigning the parallelly-executable macro tasks to the processor units, causing the parallelly-executable macro tasks to be parallelly executed by the plurality of processor units; and generating parallelized program to be executed by the multiprocessor system, based on a result of the static scheduling.

2. The parallelizing compile method according to claim 1, further comprising
performing an inline expansion which transposes a description calling a function in the sequential program to another description representing the processing in the function,
wherein, in the dividing, the sequential program after performing the inline expansion is divided into the macro tasks.

3. The parallelizing compile method according to claim 2, further comprising:
a procedure for finding a first processing block and a second processing block, in which local variables with an identical name are used, wherein the first processing block and the second processing block represent assemblies of descriptions for realizing a certain object in the function described in the sequential program; and
a renaming procedure that the descriptions in functions are changed, so that the local variables in the first processing block and the second processing block have different names each other,
wherein the specifying is performed after the names of the local variables are changed through the renaming procedure, and after the control flow between the macro tasks is analyzed.

4. A parallelizing compiler, comprising a computer or logic circuitry, the parallelizing compiler being configured to perform:
receiving a sequential program that controls an embedded system, through an input portion;
dividing a sequential program that controls an embedded system into a plurality of macro tasks according to a predetermined method, the sequential program being executed by a single processor system;
generating a macro flow graph based on analysis of a control flow and a data dependency among the macro tasks;
specifying, based on the control flow indicated in the macro flow graph, at least one pair of a starting end task and a termination end task, wherein the starting end task is a macro task that has a conditional branch, and the termination end task is one of macro tasks which are commonly executed among a plurality of series of processings of the macro tasks to be sequentially executed from the starting end task as a start point;
fusing
(i) the starting end task specified by the specifying,
(ii) the termination end task specified by the specifying, and
(iii) a group of the macro tasks executed after execution of the starting end task and before execution of the termination end task into a block task so as to hide the conditional branch of the starting end task into the block task, wherein a plurality of block tasks are provided;
extracting, based on the data dependency among the macro tasks including the block tasks after the fusing, parallelly-executable macro tasks that are parallelly-executable by a plurality of processor units included in a multiprocessor system;
performing a static scheduling assigning parallelly-executable macro tasks to the processor units, causing the parallelly-executable macro tasks to be parallelly executed by the plurality of processor units;
generating a parallelized program to be executed by the multiprocessor system, based on a result of the static scheduling; and
outputting the parallelized program generated.

5. A parallelizing compiler apparatus comprising:
a division device to divide a sequential program that controls an embedded system into a plurality of macro tasks according to a predetermined method, the sequential program being executed by a single processor system;
a generating device to generate a macro flow graph based on analysis of a control flow and a data dependency among the macro tasks;
a specifying device to specify, based on the control flow indicated in the macro flow graph, at least one pair of a starting end task and a termination end task, wherein the starting end task is a macro task that has a conditional branch, and the termination end task is one of macro tasks which are commonly executed among a plurality of a series of processings of the macro tasks to be sequentially executed from the starting end task as a start point;
a fusion device to fuse
(i) the starting end task specified by the specifying,
(ii) the termination end task specified by the specifying device, and
(iii) a group of the macro tasks executed after execution of the starting end task and before execution of the termination end task into a block task so as to hide the conditional branch of the starting end task into the block task, wherein a plurality of block tasks are provided;
an extraction device to extract, based on the data dependency among the macro tasks including the block tasks after the fusing, parallelly-executable macro tasks that are parallelly-executable by a plurality of processor units included in a multiprocessor system;
a scheduling device to perform a static scheduling assigning the parallelly-executable macro tasks to the processor units, causing the parallelly-executable macro tasks to be parallelly executed by the plurality of processor units; and
a generation device to generate a parallelized program executed by the multiprocessor system, based on a result of the static scheduling.

6. A vehicle onboard apparatus comprising: a multicore processor; a storage that stores a parallelized program generated by a parallelizing compile method; and a multiprocessor system that includes the multicore processor and is operated according to the parallelized program, wherein the parallelizing compile method includes: dividing a sequential program that controls an embedded system provided in the vehicle onboard apparatus into a plurality of macro tasks according to a predetermined method, the sequential program being executed by a single processor system; generating a macro flow graph based on analysis of a control flow and a data dependency among the macro tasks; specifying, based on the control flow indicated in the macro flow graph, at least one pair of a starting end task and a termination end task, wherein the starting end task is a macro task that has a conditional branch, and the termination end task is one of macro tasks which are commonly executed among a plurality of a series of processings of the macro tasks to be sequentially executed from the starting end task as a start point; fusing (i) the starting end task specified by the specifying, (ii) the termination end task specified by the specifying device, and (iii) a group of the macro tasks executed after execution of the starting end task and before execution of the termination end task into a block task so as to hide the conditional branch of the starting end task into the block task, wherein a plurality of block tasks are provided; extracting, based on the data dependency among the macro tasks including the block tasks after the fusing, parallelly-executable macro tasks that, are parallelly-executable by a plurality of processor units included in the multiprocessor system mounted on the onboard apparatus; performing a static scheduling assigning the parallelly-executable macro tasks to the processor units, causing parallelly-executable macro tasks to be parallelly executed by the plurality of processor units; and generating parallelized program to be executed by the multiprocessor system, based on a result of the static scheduling.

7. The parallelizing compile method according to claim 1, wherein:
 the extracting the parallelly-executable macro tasks is performed by generating a macro task graph, based on analysis of an earliest executable condition of the macro tasks including the block tasks.

* * * * *